(12) United States Patent
Baek et al.

(10) Patent No.: US 11,405,817 B2
(45) Date of Patent: Aug. 2, 2022

(54) APPARATUS AND METHOD FOR UPLINK DATA REPORT AND CONTROL CHANNEL SYNCHRONIZATION IN WIRELESS COMMUNICATION SYSTEM

(71) Applicant: Samsung Electronics Co., Ltd., Suwon-si (KR)

(72) Inventors: Sangkyu Baek, Suwon-si (KR); Soenghun Kim, Suwon-si (KR); Namhoon Kim, Suwon-si (KR); Myunghwan Kim, Suwon-si (KR); Hyoungmin Kim, Suwon-si (KR); Sungnam Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 157 days.

(21) Appl. No.: 16/535,976

(22) Filed: Aug. 8, 2019

(65) Prior Publication Data
US 2020/0053593 A1    Feb. 13, 2020

(30) Foreign Application Priority Data
Aug. 9, 2018 (KR) .................. 10-2018-0093109

(51) Int. Cl.
*H04W 28/02* (2009.01)
*H04W 72/10* (2009.01)
(Continued)

(52) U.S. Cl.
CPC ....... *H04W 28/0278* (2013.01); *H04L 1/1812* (2013.01); *H04W 56/0045* (2013.01);
(Continued)

(58) Field of Classification Search
None
See application file for complete search history.

(56) References Cited

U.S. PATENT DOCUMENTS

2009/0285237 A1* 11/2009 Chun ............... H04W 8/26
                                                          370/474
2010/0232385 A1*  9/2010 Hsu ................ H04W 74/02
                                                          370/329
(Continued)

FOREIGN PATENT DOCUMENTS

KR    10-2019-0049201 A    5/2019

OTHER PUBLICATIONS

3rd Generation Partnership Project; Technical Specification Group Radio Access Network; NR; NR and NG-RAN Overall Description; Stage 2 (Release 15), 3GPP TS 38.300 V15.6.0, Jun. 2019.
(Continued)

*Primary Examiner* — Hassan A Phillips
*Assistant Examiner* — Gautam Sharma
(74) *Attorney, Agent, or Firm* — Jefferson IP Law, LLP

(57) ABSTRACT

A pre-5th-Generation (5G) or 5G communication system to be provided for supporting higher data rates Beyond 4th-Generation (4G) communication system, such as long term evolution (LTE). A user equipment (UE) in a wireless communication system is provided. The UE includes a transceiver, and at least one processor coupled to the transceiver and configured to generate a lone truncated buffer status report (BSR) based on a number of padding bits, and transmit the long truncated BSR informing of data volume for at least one logical channel group among logical channel groups having data for transmission, wherein the data volume for the at least one logical channel group is reported following an order that is determined based on a highest priority logical channel in each of the at least one logical channel group.

11 Claims, 22 Drawing Sheets

(51) Int. Cl.
  *H04W 76/11* (2018.01)
  *H04L 1/18* (2006.01)
  *H04W 56/00* (2009.01)
  *H04W 74/08* (2009.01)
  *H04W 76/27* (2018.01)

(52) U.S. Cl.
  CPC ....... *H04W 72/10* (2013.01); *H04W 74/0833* (2013.01); *H04W 76/11* (2018.02); *H04W 76/27* (2018.02)

(56) References Cited

U.S. PATENT DOCUMENTS

| | | | |
|---|---|---|---|
| 2012/0113922 A1* | 5/2012 | Kim | H04W 72/1284 370/329 |
| 2013/0039314 A1* | 2/2013 | Prateek | H04W 74/08 370/329 |
| 2013/0107722 A1* | 5/2013 | Huang | H04W 28/12 370/241 |
| 2013/0114445 A1 | 5/2013 | Wen et al. | |
| 2013/0272319 A1 | 10/2013 | Chun et al. | |
| 2016/0021628 A1 | 1/2016 | Jang et al. | |
| 2016/0044678 A1 | 2/2016 | Kwon | |
| 2016/0119945 A1* | 4/2016 | Fang | H04W 28/0278 455/450 |
| 2016/0381653 A1 | 12/2016 | Tynderfeldt et al. | |
| 2017/0013640 A1* | 1/2017 | Loehr | H04W 76/14 |
| 2017/0019812 A1 | 1/2017 | Lee et al. | |
| 2017/0019930 A1 | 1/2017 | Lee et al. | |
| 2018/0077600 A1 | 3/2018 | Feuersaenger et al. | |
| 2018/0270698 A1* | 9/2018 | Babaei | H04W 24/08 |
| 2018/0368023 A1* | 12/2018 | Hong | H04W 72/10 |
| 2019/0053260 A1* | 2/2019 | Shaheen | H04W 72/1242 |
| 2020/0045577 A1* | 2/2020 | Yu | H04W 72/1278 |
| 2020/0344640 A1* | 10/2020 | Wu | H04W 72/10 |
| 2021/0022205 A1* | 1/2021 | Sun | H04L 5/00 |

OTHER PUBLICATIONS

3rd Generation Partnership Project; Technical Specification Group Radio Access Network; NR; Medium Access Control (MAC) protocol specification (Release 15), 3GPP TS 38.321 V15.6.0, Jun. 2019.

3rd Generation Partnership Project; Technical Specification Group Radio Access Network; NR; Radio Resource Control (RRC) protocol specification (Release 15), 3GPP TS 38.331 V15.6.0, Jun. 2019.

Samsung, Long BSR MAC CE for one LCG, 3GPP TSG-RAN WG2 AH 1807, R2-1809498, Jun. 21, 2018, Montreal, QC.

CMCC, Correction to Buffer Status Reporting, 3GPP TSG-RAN WG2 NR AH1807 Meeting, R2-1810538, Jun. 22, 2018, Montreal, Canada.

International Search Report dated Dec. 30, 2019, issued in International Application No. PCT/KR2019/010001.

Partial Supplementary European Search Report dated Sep. 30, 2021, issued in a counterpart European Application No. 19847640.0—1205.

Nokia, Nokia Shanghai Bell; Zero No. of BS field; 3GPP TSG-RAN WG2 Meeting NR Adhoc 1807; R2-1810604; Jul. 6, 2018, Montreal, Canada.

Catt, RAN2; Corrections on BSR; 3GPP TSG-RAN WG2#102; R2-1807001; May 25, 2018, Busan, Korea.

* cited by examiner

APPARATUS AND METHOD FOR UPLINK DATA REPORT AND CONTROL CHANNEL SYNCHRONIZATION IN WIRELESS COMMUNICATION SYSTEM

CROSS-REFERENCE TO RELATED APPLICATION(S)

This application is based on and claims priority under 35 U.S.C. 119(a) of a Korean patent application number 10-2018-0093109, filed on Aug. 9, 2018, in the Korean Intellectual Property Office, the disclosure of which is incorporated by reference herein in its entirety.

BACKGROUND

1. Field

The disclosure relates to a wireless communication system. More particularly, to an apparatus and a method for uplink data reporting and control channel synchronization in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A 5G system can provide various services to a terminal. To this end, the terminal can receive and transmit data from/to a base station. In case that the terminal transmits data, the terminal receives an uplink grant from the base station so that resources are allocated to the terminal. At this time, in order to allocate uplink resources to the terminal, the base station can check a buffer status for uplink data of the terminal. In addition, in order for the terminal to perform communication with the base station, synchronization of wireless signals may be required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for uplink data reporting and control channel synchronization in a wireless communication system.

Additional aspects will be set forth in part in the description which follows and, in part, will be apparent from the description, or may be learned by practice of the presented embodiments.

According to an embodiment of the disclosure, an apparatus and a method is provided for efficiently transmitting a report on uplink data in a wireless communication system.

According to an embodiment of the disclosure, an apparatus and a method is provided for efficiently synchronizing a control channel in a wireless communication system.

In accordance with an embodiment of the disclosure, a user equipment (UE) in a wireless communication system is provided. The UE includes a transceiver, and at least one processor coupled to the transceiver and configured to generate a lone truncated buffer status report (BSR) based on a number of padding bits, and transmit the long truncated BSR informing of data volume for at least one logical channel group among logical channel groups having data for transmission, wherein the data volume for the at least one logical channel group is reported following an order that is determined based on a highest priority logical channel in each of the at least one logical channel group.

In accordance with another embodiment of the disclosure, a base station in a wireless communication system is provided. The base station includes a transceiver, and at least one processor coupled to the transceiver and configured to receive, from a UE, a long truncated BSR informing of data volume for at least one logical channel group among logical channel groups having data for transmission, the logical channel groups being established at the UE, wherein the data volume for the at least one logical channel group is reported following an order that is determined based on a highest priority logical channel in each of the at least one logical channel group.

In accordance with another embodiment of the disclosure, a UE in a wireless communication system is provided. The UE includes a transceiver, and at least one processor coupled to the transceiver and configured to receive, from a base station, first system information comprising a time-alignment-timer-common value, transmit, to the base station, a random access preamble in order to transmit one of a first message for requesting to resume a radio resource control (RRC) connection and a second message for requesting second system information, receive, form the base station, a random access response comprising a timing advanced (TA) command, after transmitting the random access preamble, start a time alignment timer that has a length indicated by the time-alignment-timer-common value, and transmit one of the first message and the second message.

The apparatus and method according to an embodiment can efficiently report the status of uplink data and enable synchronization of a control channel.

Effects which can be acquired by the disclosure are not limited to the above described effects, and other effects that have not been mentioned may be clearly understood by those skilled in the art from the following description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
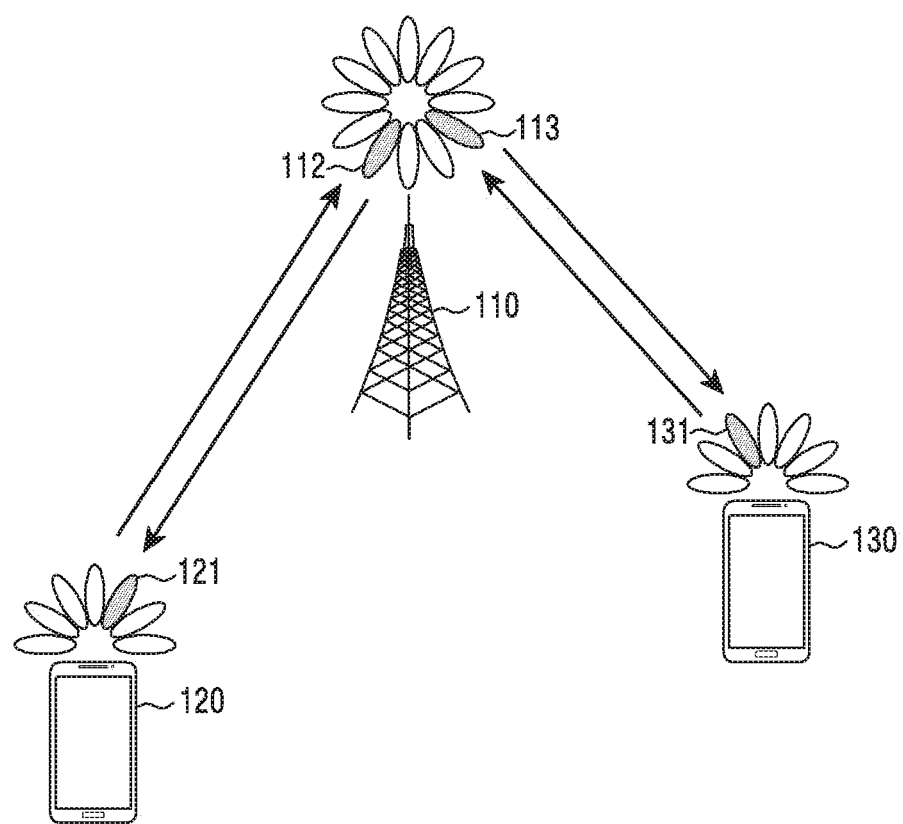
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure are only used to describe specific embodiments of the disclosure, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, an embodiment of the disclosure will be described based on an approach of hardware. However, an embodiment of the disclosure include a technology that uses both hardware and software and thus, the embodiment of the disclosure may not exclude the perspective of software.

The disclosure relates to an apparatus and a method for transmitting information on uplink data and maintaining synchronization with a base station in a wireless communication system.

It should be noted that the terms used in the following description, such as terms referring to signals, terms referring to channels, terms referring to control information, terms referring to control parameters, terms referring to network entities, terms referring to components of the apparatus, and the like are illustrated for convenience of explanation. Accordingly, the disclosure is not limited to terms to be described below, and other terms having equivalent technical meanings can be used.

In addition, the disclosure describes an embodiment using terms used in some communication standards (e.g., 3rd Generation Partnership Project (3GPP)), but this is merely illustrative. The embodiment can be easily modified and applied in other communication systems as well.

FIG. 1 illustrates a wireless communication system according to an embodiment of the disclosure.

Referring to FIG. 1, a base station 110, a terminal 120, and a terminal 130 are illustrated as some of nodes using a wireless channel in a wireless communication system. Although FIG. 1 illustrates only one base station, it may further include another base station which is the same as or similar to the base station 110.

The base station 110 is a network infrastructure that provides wireless access to the terminals 120 and 130. The base station 110 has a coverage defined by a certain geographic area based on a distance at which signals can be transmitted. The base station 110 may be referred to as an "access point (AP)", an "evolved Node B (eNodeB)", a "5th generation (5G) node", "5G node B (gNobeB, gNB)", a "wireless point", or a "transmission/reception point (TRP)", or may be referred to as other terms having equivalent technical meanings thereto.

Each of the terminal 120 and the terminal 130 is a device used by a user and communicates with the base station 110 via a wireless channel. In some cases, at least one of the terminal 120 and the terminal 130 can be operated without user involvement. For example, at least one of the terminal 120 and the terminal 130 is a device for performing machine type communication (MTC), and may not be carried by a user. Each of the terminal 120 and the terminal 130 may be referred to as a "user equipment (UE)", a "mobile station", a "subscriber station", a "remote terminal", a "wireless terminal", or a "user device", or may be referred to as other terms having equivalent technical meanings thereto.

The base station 110, the terminal 120, and the terminal 130 may transmit and receive wireless signals in a millimeter wave (mmWave) band (e.g., 28 GHz, 30 GHz, 38 GHz, or 60 GHz). At this time, in order to improve a channel gain, the base station 110, the terminal 120, and the terminal 130 may perform beamforming. Here, beamforming may include transmission beamforming and reception beamforming. For example, the base station 110, the terminal 120, and the terminal 130 may assign directivity to transmission signals or reception signals. To this end, the base station 110 and the terminals 120 and 130 may select serving beams 112, 113, 121, and 131 through a beam search or beam management procedure. After the serving beams 112, 113, 121, and 131 are selected, communication may then be performed through resources that are in a quasi co-located (QCL) relationship with resources that have transmitted the serving beams 112, 113, 121, and 131.

If large-scale characteristics of a channel that transmits a symbol on a first antenna port can be inferred from a channel that transmits a symbol on a second antenna port, it can be evaluated that the first antenna port and the second antenna port are in a QCL relationship. For example, the large-scale characteristics may include at least one of delay spread, Doppler spread, Doppler shift, average gain, average delay, and spatial receiver parameter.

Figure 2:
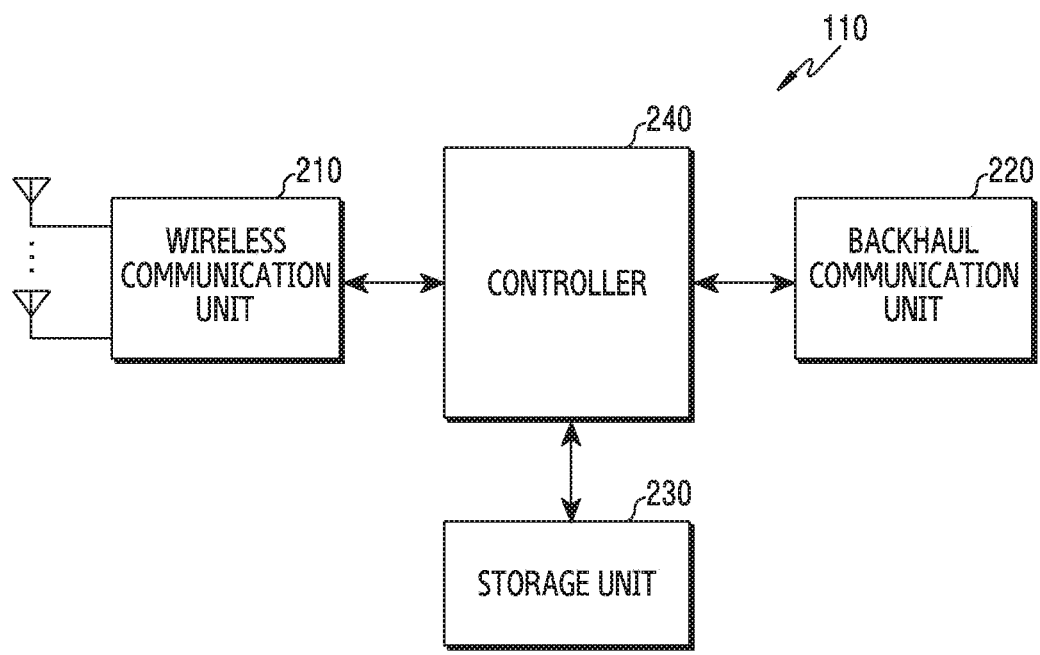
FIG. 2 illustrates a configuration of a base station in a wireless communication system according to an embodiment of the disclosure.

FIG. 2 illustrates a configuration of a base station in a wireless communication system according to an embodiment of the disclosure. The configuration illustrated in FIG. 2 can be understood as a configuration of the base station 110. Terms such as " . . . unit", " . . . -er (-or)", and the like used herein denote a unit for processing at least one function or operation, and may be implemented by hardware, software, or a combination of hardware and software.

Referring to FIG. 2, a base station includes a wireless communication unit 210, a backhaul communication unit 220, a storage unit 230, and a controller 240.

The wireless communication unit 210 performs functions for transmitting and receiving signals via a wireless channel. For example, the wireless communication unit 210 performs conversion between a baseband signal and a bit string according to a physical layer standard of the system. For example, at the time of transmitting data, the wireless communication unit 210 generates complex symbols by encoding and modulating a transmission bit string. In addition, at the time of receiving data, the wireless communication unit 210 demodulates and decodes the baseband signal to recover a reception bit string.

In addition, the wireless communication unit 210 up-converts a baseband signal into a radio frequency (RF) band signal, transmits the RF band signal through an antenna, and down-converts the RF band signal received through the antenna into a baseband signal. To this end, the wireless communication unit 210 may include a transmission filter, a reception filter, an amplifier, a mixer, an oscillator, a digital to analog converter (DAC), and an analog to digital converter (ADC). In addition, the wireless communication unit 210 may include a plurality of transmission/reception paths. Further, the wireless communication unit 210 may include at least one antenna array composed of a plurality of antenna elements.

In terms of hardware, the wireless communication unit 210 may be composed of a digital unit and an analog unit. The analog unit may include a plurality of sub-units according to operating power, an operating frequency, and the like. The digital unit may be implemented with at least one processor (e.g., a digital signal processor {DSP}).

The wireless communication unit 210 transmits and receives signals as described above. Accordingly, all or a part of the wireless communication unit 210 may be referred to as a "transmitter", a "receiver", or a "transceiver". In the following description, the transmission and reception performed through a wireless channel are used to mean that the above-described processing is performed by the wireless communication unit 210.

The backhaul communication unit 220 provides an interface for performing communication with other nodes in a network. For example, the backhaul communication unit 220 converts bit strings transmitted from the base station to other nodes, for example, another access node, another base station, an upper node, a core network, and the like, into physical signals, and converts the physical signal received from the other nodes into bit strings.

The storage unit 230 stores data, such as a basic program, an application program, configuration information, and the like, for operation of the base station. The storage unit 230 may be composed of a volatile memory, a nonvolatile memory, or a combination of the volatile memory and the nonvolatile memory. The storage unit 230 provides the stored data in response to a request of the controller 240.

The controller 240 controls the overall operations of the base station. For example, the controller 240 transmits and receives signals through the wireless communication unit 210 or the backhaul communication unit 220. In addition, the controller 240 records data in the storage unit 230 and reads the recorded data. The controller 240 may perform functions of a protocol stack required by a communication standard. According to another embodiment of the disclosure, the protocol stack may be included in the wireless communication unit 210. To this end, the controller 240 may include at least one processor. According to an embodiment of the disclosure, the controller 240 may control the base station to perform operations according to an embodiment described below.

Figure 3:
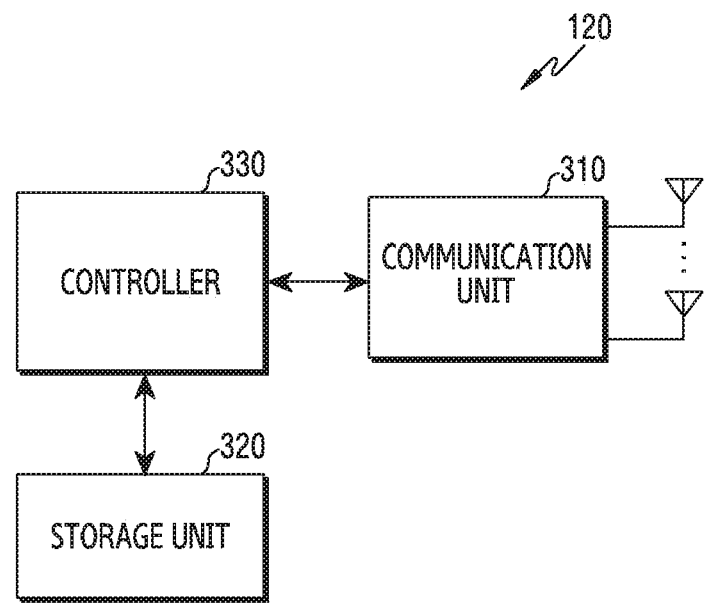
FIG. 3 illustrates a configuration of a terminal in a wireless communication system according to an embodiment of the disclosure.

FIG. 3 illustrates a configuration of a terminal in a wireless communication system according to an embodiment of the disclosure. The configuration illustrated in FIG. 3 can be understood as a configuration of the terminal 120. Terms such as " . . . unit", " . . . -er (-or)", and the like used herein denote a unit for processing at least one function or operation, and may be implemented by hardware, software, or a combination of hardware and software.

Referring to FIG. 3, the terminal includes a communication unit 310, a storage unit 320, and a controller 330.

The communication unit 310 performs functions for transmitting and receiving signals through a wireless channel. For example, the communication unit 310 performs conversion between a baseband signal and a bit string according to a physical layer standard of the system. For example, at the time of transmitting data, the communication unit 310 generates complex symbols by encoding and modulating a transmission bit string. In addition, at the time of receiving data, the communication unit 310 demodulates and decodes the baseband signal to recover a reception bit string. In addition, the communication unit 310 up-converts a baseband signal into an RF band signal, transmits the RF band signal through an antenna, and down-converts the RF band signal received through the antenna into a baseband signal. For example, the communication unit 310 may include a transmission filter, a reception filter, an amplifier, a mixer, an oscillator, a DAC, and an ADC.

In addition, the communication unit 310 may include a plurality of transmission/reception paths. Further, the communication unit 310 may include at least one antenna array composed of a plurality of antenna elements. In terms of hardware, the communication unit 310 may be composed of a digital circuit and an analog circuit (e.g., radio frequency integrated circuit {RFIC}). The digital circuit and the analog circuit may be implemented in one package. In addition, the communication unit 310 may include a plurality of RF chains. Further, the communication unit 310 may perform beamforming.

The communication unit 310 transmits and receives signals as described above. Accordingly, all or a part of the communication unit 310 may be referred to as a "transmitter", a "receiver", or a "transceiver". In the following description, the transmission and reception performed through a wireless channel are used to mean that the above-described processing is performed by the communication unit 310.

The storage unit 320 stores data, such as a basic program, an application program, configuration information, and the like, for operation of the terminal. The storage unit 320 may be composed of a volatile memory, a nonvolatile memory, or a combination of the volatile memory and the nonvolatile memory. The storage unit 320 provides the stored data in response to a request of the controller 330.

The controller 330 controls the overall operations of the terminal. For example, the controller 330 transmits and receives signals through the communication unit 310. In addition, the controller 330 records data in the storage unit 320 and reads the recorded data. The controller 330 may perform functions of a protocol stack required by a communication standard. To this end, the controller 330 may include at least one processor or microprocessor, or may be a part of the processor. In addition, a part of the communication unit 310 and the controller 330 may be referred to as a communication processor (CP). According to an embodiment of the disclosure, the controller 330 may control the terminal to perform operations according to an embodiment described below.

Figure 4:
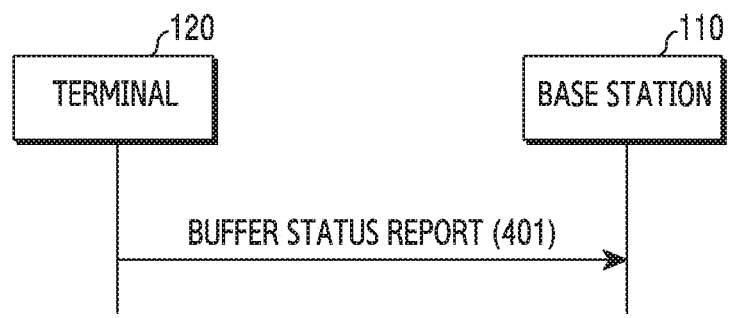
FIG. 4 illustrates a procedure for transmitting a buffer status report (BSR) message in a wireless communication system according to an embodiment of the disclosure.

FIG. 4 illustrates a procedure for transmitting a buffer status report (BSR) message in a wireless communication system according to an embodiment of the disclosure.

Referring to FIG. 4, in operation 401 the terminal 120 reports a data volume of uplink data stored in a buffer in order to transmit the uplink data to the base station 110, which is referred to as "buffer status reporting". At this time, the reported data volume may not be for each of all logical channels configured in the terminal. If the terminal reports the data volume for each of the configured logical channels, the size of the BSR message reported if a plurality of logical channels are configured may become too large. An increase in the size of the BSR message may lead to a decrease in coverage or a depletion of radio resources. Accordingly, the terminal may classify the configured logical channels into a plurality of logical channel groups (LCGs), and may indicate a sum of the data volume for all logical channels belonging to each LCG for each LCG using the BSR message.

In the following description, it is understood that a "logical channel having data" means a logical channel related to data buffered in the terminal. For example, if the buffered data is to be transmitted through a specific logical channel, the specific logical channel may be referred to as the "logical channel having data". Similar expressions can also be used for logical channel group (LCGs).

The BSR message can be classified into a periodic BSR, a regular BSR, and a padding BSR depending on the time during which the message is transmitted and an amount of information.

The periodic BSR is used to report a data volume to the base station at regular intervals. According to wireless communication procedures of the base station and the terminal and the operation of a data application, the data volume buffered in the terminal may be changed in real-time. In order for the base station to continuously update the changed data volume, periodic transmission of the BSR may be required. For transmission of the periodic BSR, the base station may configure a periodic BSR timer value to the terminal. If the timer expires, the terminal performs a procedure of transmitting the periodic BSR.

The periodic BSR is transmitted on an event basis. For example, if it is necessary to report the data volume to the base station due to generation of new data for a logical channel having a higher priority than a logical channel that previously had data, or if data related to a specific LCG is no longer generated, the periodic BSR is transmitted. Based on the periodic BSR, the base station may use the BSR for uplink scheduling.

The padding BSR refers to a BSR included in the remaining resources if residual resources remain after data and a media access control (MAC) control element (CE) are included in an MAC protocol data unit (PDU) allocated to the terminal. If the padding BSR is not transmitted, the corresponding radio resource is used as a simple padding so that the radio resource may be wasted. Therefore, by allowing the BSR to be included in the remaining resources, the terminal may transmit a resource status of the terminal to the base station. The communication system may force or recommend the transmission of the padding BSR.

Figure 5:
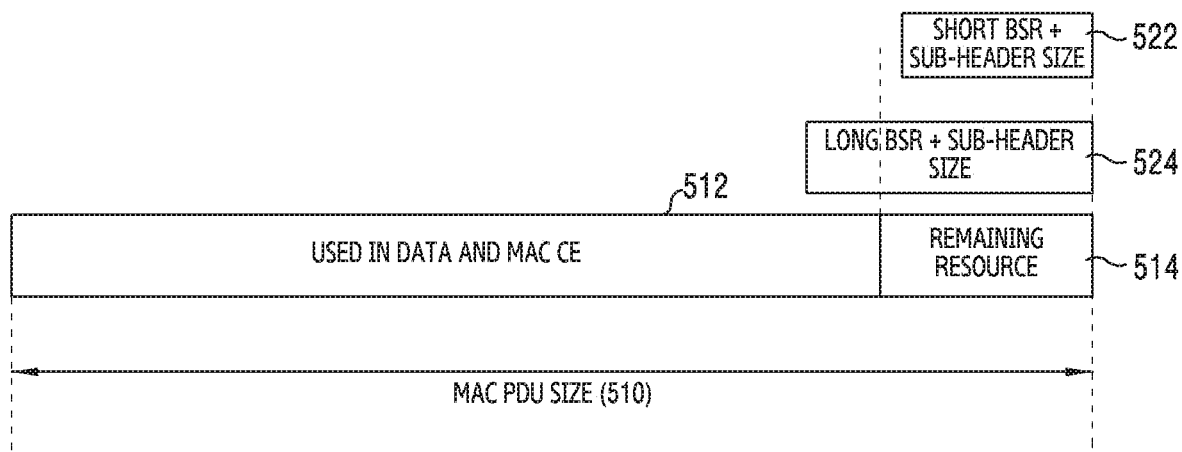
FIG. 5 illustrates a case in which a terminal transmits a long truncated BSR in a wireless communication system according to an embodiment of the disclosure.

FIG. 5 illustrates a case in which a terminal transmits a long truncated BSR in a wireless communication system according to an embodiment of the disclosure. FIG. 5 illustrates examples of the padding BSR.

Referring to FIG. 5, if resources are left even though both data of a logical channel and an MAC CE 512 are filled in an uplink MAC PDU 510 allocated to the terminal, the terminal may transmit the BSR using the remaining resource 514. Here, the type of the BSR to be transmitted depends on the size of the remaining resources. In other words, as the padding BSR using padding, what type of BSR to be transmitted may depend on the number of padding bits.

For example, if the amount of the remaining resources 514 is equal to the size of each of a short BSR and an MAC sub-header 522 of the short BSR, the short BSR may be included. In addition, even if there is only one LCG in which the terminal stores data, the terminal may transmit the short BSR.

As another example, if the number of LCGs having data is two or more and the amount of the remaining resources 514 is equal to or greater than the size of each of a long BSR including buffer sizes of all LCGs having data and an MAC sub-header 524 of the long BSR, the terminal may transmit the long BSR. If the amount of the remaining resources 514 is smaller than the size of each of the long BSR including buffer sizes of all LCGs having data and the MAC sub-header 524 of the long BSR and greater than the size of each of the short BSR and the MAC sub-header 522 of the short BSR, the terminal may transmit a long truncated BSR. Here, "truncated" means that it does not include buffer size information of all LCGs having data, but includes buffer size information for some of the LCGs. At this time, the LCG of which the buffer size information is included in the long truncated BSR may be determined according to a priority of the LCGs or a priority of logical channels included in the LCGs.

Figure 6:
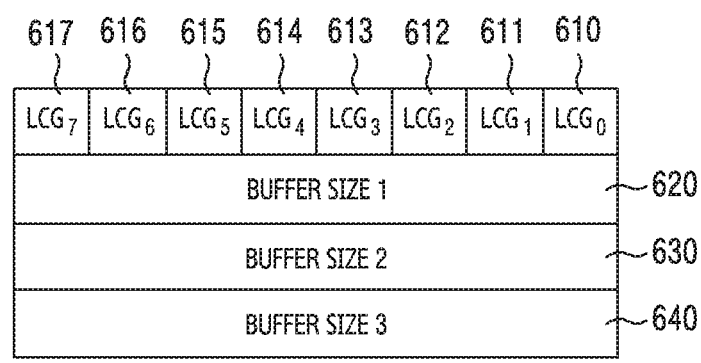
FIG. 6 illustrates a type of a long truncated BSR in a wireless communication system according to an embodiment of the disclosure.

FIG. 6 illustrates a type of a long truncated BSR in a wireless communication system according to an embodiment of the disclosure.

Referring to FIG. 6, a long truncated BSR may include LCGi fields 610 to 617 indicating whether each LCG has data and buffer size fields 620, 630, and 640 each indicating the data volume stored by an actual LCG. Here, an index i of the LCGi field denotes a logical channel group identifier (LCG ID) of the LCG. For example, an LCG3 field indicates whether an LCG 3 has stored data. For example, the LCGi field set to "0" means that the corresponding LCG has no data, and the LCGi field set to "1" means that the corresponding LCG has data.

The long truncated BSR may include buffer sizes for some of all LCGs in which the LCGi field is indicated by "1". In other words, if the number of the LCGi fields indicated by "1" is n, n−1 or less buffer size fields may exist. Thus, if the long truncated BSR is used, only the buffer sizes for some LCGs selected from the LCGs including the logical channel having data are reported. In the embodiment of FIG. 6, the buffer sizes 620, 630, and 640 of three LCGs are reported. If the BSR of FIG. 6 is a long truncated BSR, four or more LCGi fields may be set to "1".

Figure 7:
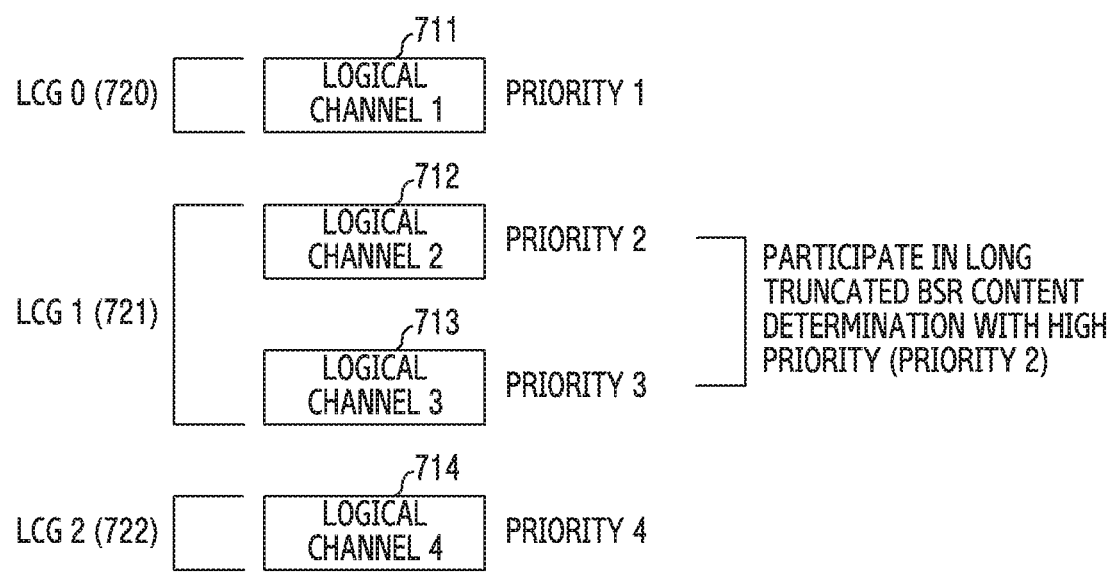
FIG. 7 illustrates setting of a priority that represents a logical channel group in a wireless communication system according to an embodiment of the disclosure.

FIG. 7 illustrates setting of a priority that represents a logical channel group in a wireless communication system according to an embodiment of the disclosure.

Referring to FIG. 7, it is assumed that a total of four logical channels including a logical channel 1 711, a logical channel 2 712, a logical channel 3 713, and a logical channel 4 714 are set. In FIG. 7, the logical channel 1 711 is set to an LCG 0 720, the logical channel 2 712 and the logical channel 3 713 are set to an LCG 1 721, and the logical channel 4 714 is set to an LCG 2 722. In addition, in FIG. 7, a priority 1 is assigned to the logical channel 1 711, a priority 2 is assigned to the logical channel 2 712, a priority 3 is assigned to the logical channel 3 713, and the priority 2 is assigned to the logical channel 4 714. In FIG. 7, a priority having a small value can be interpreted as a high priority.

The priority that each logical channel has and the LCG to which each logical channel belongs can be known through a radio resource control (RRC) setting message of the base station. If a long truncated BSR is triggered so that the terminal has to generate the long truncated BSR, the terminal should select some logical channels among LCGs including logical channels having data, and should transmit information on the buffer size using the long truncated BSR. At this time, the terminal may determine whether to report the buffer size information of the LCG based on the priority of each logical channel.

As in the embodiment of FIG. 7, the disclosure proposes an embodiment in which, in determining the priority of the LCG including at least one logical channel having data if a long truncated BSR is generated, the priority of the logical channel having the highest priority regardless of whether each logical channel has data is used as a representative priority of the corresponding LCG. The LCG 1 721 of FIG. 7 includes the logical channel 2 712 and the logical channel 3 713, and if the long truncated BSR is generated, the priority 2 of the logical channel 2 712 having a higher priority between the logical channel 2 712 and the logical channel 3 713 may be used as the priority of the LCG 1 721. At this time, the presence or absence of data of the logical channel 2 712 and the logical channel 3 713 does not affect the priority determination of the LCG 1 721. Accordingly, if the long truncated BSR is generated, the terminal may select LCGs to be reported in descending order or ascending order of the priority of the logical channel with the highest priority in the corresponding LCG, and may then report the buffer size. If there are LCGs with the same priority, the LCGs are prioritized according to additional criteria. For example, the smaller the LCG ID number, the higher priority can be assigned, or the larger the logical channel ID number, the higher priority can be assigned.

According to the embodiment of FIG. 7, the priority of the logical channel with the highest priority in the LCG is determined as the priority of the LCG, and the priority of the LCG determined if transmitting the long truncated BSR is used. However, according to another embodiment of the disclosure, the priority of the logical channel with the lowest priority in the LCG can be used as the priority of the LCG. According to another embodiment of the disclosure, an average or median value of the priorities of all logical channels set in the LCG can be used as the priority of the corresponding LCG. According to the embodiment of FIG. 7, there is no possibility that an LCG in which the buffer size is reported to the long truncated BSR is variable depending on the presence and absence of data of the logical channel. This allows the base station to know relatively precisely the buffer size of the LCG that has been reported.

The embodiment of FIG. 7 is equally applicable to a short truncated BSR. The terminal may report a data volume for an LCG including the logical channel with the highest priority among the LCGs including the logical channels having data, using the BSR. If there are LCGs having the same priority, the priority of the LCG may be determined according to additional other criteria. For example, the smaller the LCG ID number, the higher priority can be assigned, or the larger the logical channel ID number, the higher priority can be assigned.

Figure 8:
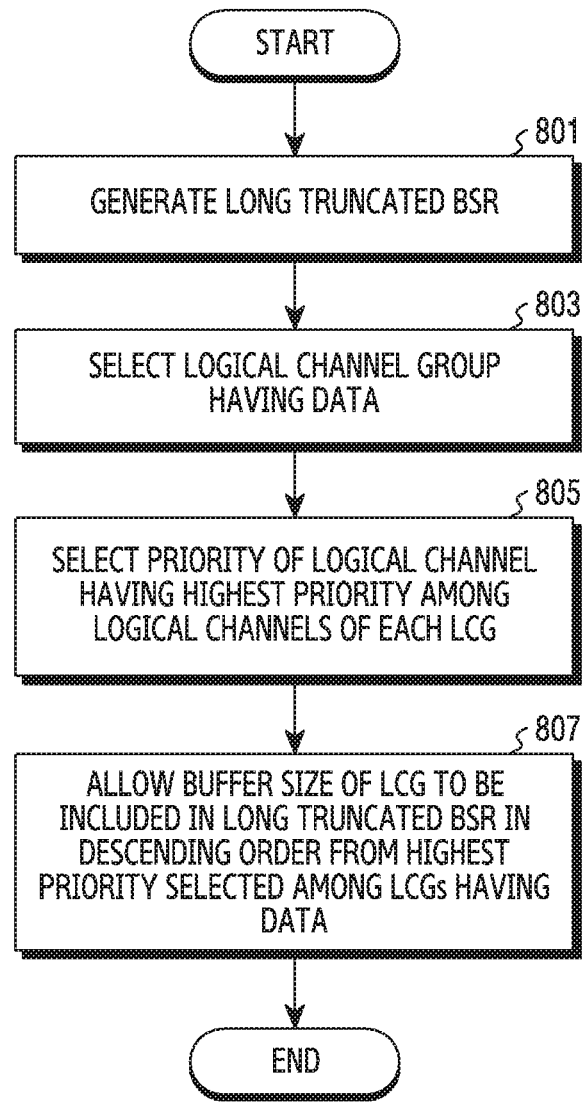
FIG. 8 is a flowchart for selecting a logical channel group to be reported to a long truncated BSR in a wireless communication system according to an embodiment of the disclosure.

FIG. 8 is a flowchart for selecting an LCG to be reported to a long truncated BSR in a wireless communication system according to an embodiment of the disclosure. FIG. 8 illustrates an operation method of the terminal 120.

Referring to FIG. 8, in operation 801 if a long truncated BSR is to be transmitted according to the conditions shown in the embodiment of FIG. 5, the terminal selects at least one LCG to be included in the long truncated BSR in operation 803. In operation 805, the terminal selects the priority of the logical channel having the highest priority or the lowest priority among the logical channels of each LCG, and determines the selected priority as a representative value of the LCG.

Next, in operation 807, the terminal allows the buffer size of at least one LCG to be included in a long truncated BSR in descending order from the highest priority representative value of the LCG selected in operation 805 or in ascending order from the lowest priority representative value thereof among the LCGs having data. At this time, each of the LCGi fields illustrated in FIG. 6 may be set to "1" for an LCG having a logical channel having actual data.

Figure 9:
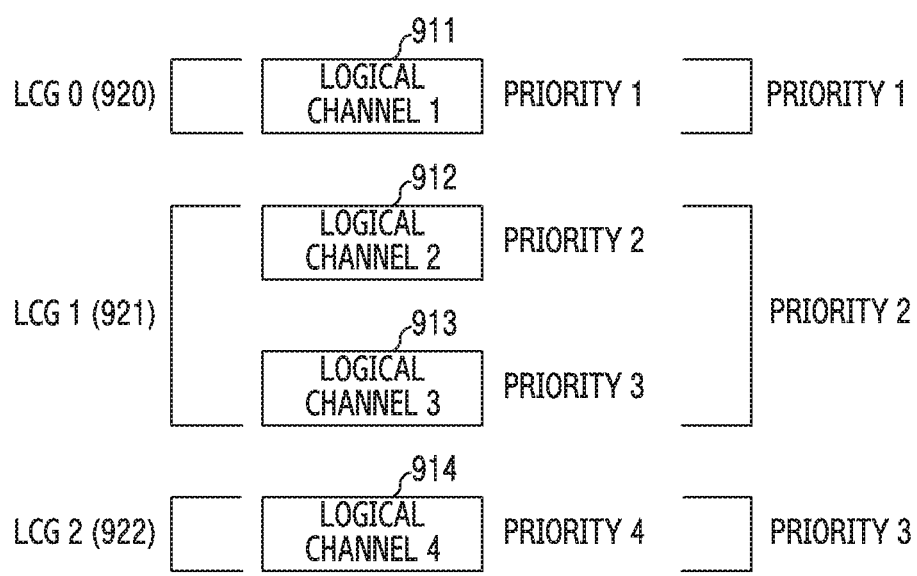
FIG. 9 illustrates setting of a priority that represents a logical channel group in a wireless communication system according to an embodiment of the disclosure.

FIG. 9 illustrates setting of a priority that represents an LCG in a wireless communication system according to an embodiment of the disclosure.

Referring to FIG. 9, it is assumed that a total of four logical channels including a logical channel 1 911, a logical channel 2 912, a logical channel 3 913, and a logical channel 4 914 are set. In FIG. 9, the logical channel 1 911 is set to an LCG 0 920, the logical channel 2 912 and the logical channel 3 913 are set to an LCG 1 921, and the logical channel 4 914 is set to an LCG 2 922. In addition, in FIG. 9, a priority 1 is assigned to the logical channel 1 911, a priority 2 is assigned to the logical channel 2 912, a priority 3 is assigned to the logical channel 3 913, and the priority 2 is assigned to the logical channel 4 914. In FIG. 9, each LCG has a separate priority, the LCG 0 920 has the priority 1, the LCG 1 921 has the priority 2, and the LCG 2 922 has the priority 3. Here, a priority having a small value can be interpreted as a high priority. The priority that each logical channel has and the LCG to which each logical channel belongs can be known through an RRC setting message of the base station. If a long truncated BSR is triggered so that the long truncated BSR has to be generated, the terminal has to select some logical channels among LCGs including logical channels having data and transmit buffer size information using the long truncated BSR. At this time, the terminal may determine whether to report the buffer size information of the LCG based on the priority of each logical channel. According to another embodiment of the disclosure, the priority of the LCG may be determined based on the priority of the logical channel, a logical channel ID, an LCG ID, and the like.

As in the embodiment of FIG. 9, the disclosure proposes an embodiment in which, if a long truncated BSR is generated, the priority of the LCG with the highest priority regardless of whether each logical channel has data is used in the LCG including logical channels having data. In other words, if the long truncated BSR is generated, the terminal may select LCGs to be reported in descending order or ascending order of the priority of the LCG with the highest priority in the corresponding LCG, and may then report the buffer size. If there are LCGs with the same priority, the LCG of which the LCG ID number is small or large among the LCGs with the same priority may have a high priority.

According to the embodiment of FIG. 9, there is no possibility that an LCG in which the buffer size is reported to the long truncated BSR is variable depending on the presence and absence of the stored data of the logical channel. This allows the base station to know precisely the buffer size of the LCG that has been reported. The embodiment of FIG. 9 is equally applicable to a short truncated BSR. At this time, the terminal may report a data volume for an LCG with the highest priority among the LCGs including the logical channels having data at the time of BSR. If there are LCGs having the same priority, the LCG of which the LCG ID number is small or large among the LCGs with the same priority may have a high priority.

Figure 10:
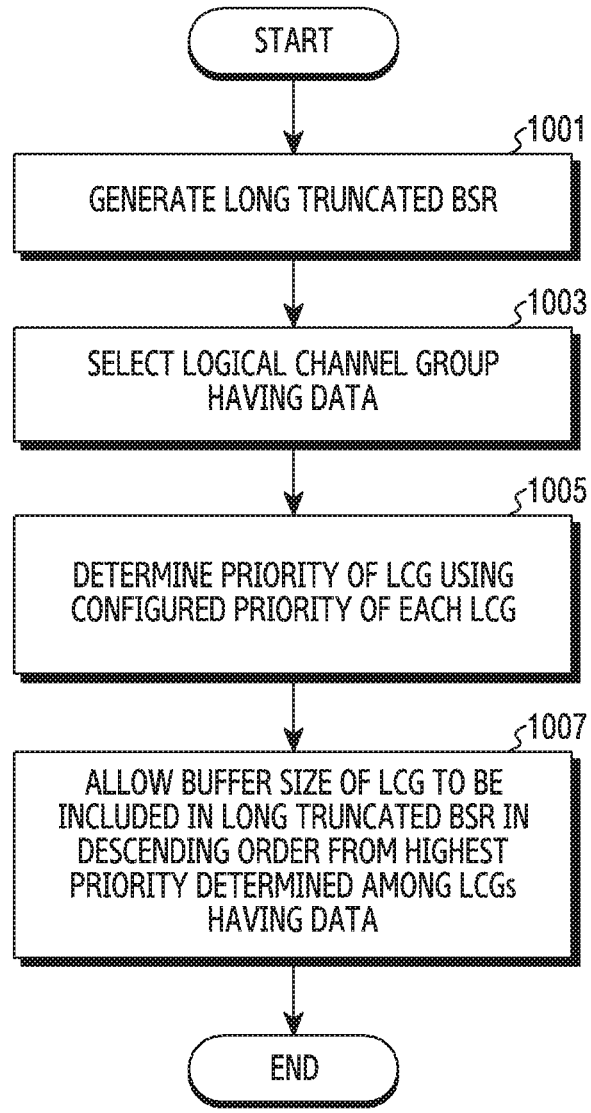
FIG. 10 is a flowchart for selecting a logical channel group to be reported to a long truncated BSR in a wireless communication system according to an embodiment of the disclosure.

FIG. 10 is a flowchart for selecting a logical channel group to be reported to a long truncated BSR in a wireless communication system according to an embodiment of the disclosure. FIG. 10 illustrates an operation method of the terminal 120.

Referring to FIG. 10, in operation 1001 if a long truncated BSR is to be transmitted according to the conditions shown in the embodiment of FIG. 5, the terminal selects at least one LCG to be included in the long truncated BSR in operation 1003. At this time, in operation 1005, the terminal may determine a preset priority of the LCG for each LCG as the priority of the actual LCG. Next, in operation 1007, the terminal selects the LCGs in descending order from the highest priority representative value of the LCG selected in operation 1005 or in ascending order from the lowest priority representative value thereof among the LCGs having the stored data, and allows the buffer size of the corresponding LCG to be included in the long truncated BSR. At this time, each of the LCGi fields illustrated in FIG. 6 may be set to "1" for an LCG having a logical channel having actually stored data.

Figure 11:
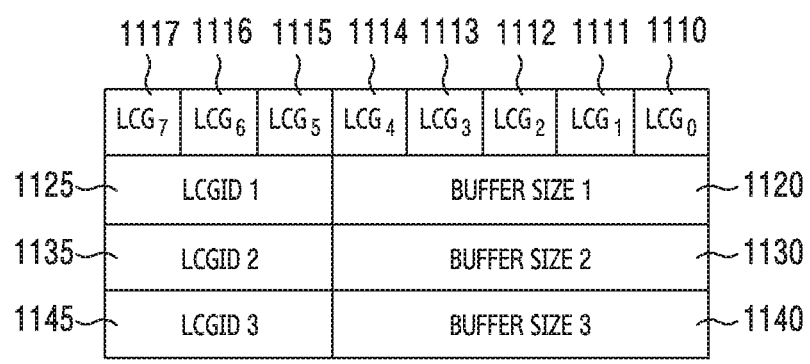
FIG. 11 illustrates an embodiment of a type of a long truncated BSR in a wireless communication system according to an embodiment of the disclosure.

FIG. 11 illustrates an embodiment of a type of a long truncated BSR in a wireless communication system according to an embodiment of the disclosure.

Referring to FIG. 11, a long truncated BSR may include LCGi fields 1110 to 1117 each indicating whether each LCG stores data, buffer size fields 1120, 1130, and 1140 each indicting a data volume stored by an actual LCG, LCG ID fields 1125, 1135, and 1145 each indicating the LCG represented by the buffer size field. Here, an index i of the LCGi field denotes an LCG ID of the LCG. For example, an LCG3 field indicates whether an LCG 3 has stored data. For example, the LCGi field set to "0" means that the corresponding LCG does not have the stored data, and the LCGi field set to "1" means that the corresponding LCG has the stored data. In the case of a long truncated BSR, the buffer size for all LCGs whose LCGi field is represented by "1" cannot be included in the BSR. In this case, only the buffer size for the selected LCG among the LCGs including the logical channel having the stored data is reported.

The embodiment of FIG. 11 illustrates that buffer sizes 1120, 1130, and 1140 of three LCGs are reported. If the BSR of FIG. 11 is a long truncated BSR, four or more LCGi(s) may be represented by "1". At this time, the base station may not know exactly the buffer size of the LCG that has been reported. To address this issue, the LCG ID fields 1125, 1135, and 1145 can be used to indicate the LCG ID corresponding to the following buffer size fields 1120, 1130, 1140. Thus, in the embodiment of FIG. 11, the buffer size field is reduced to 5 bits, and a buffer size index corresponding to a 5-bit buffer size table used in the short BSR can be used. However, according to an embodiment of the disclosure, an existing 8-bit buffer size table may be used and the actual buffer size field may also be 8 bits. In this case, the LCG ID and the buffer size cannot be expressed in one byte.

Figure 12:
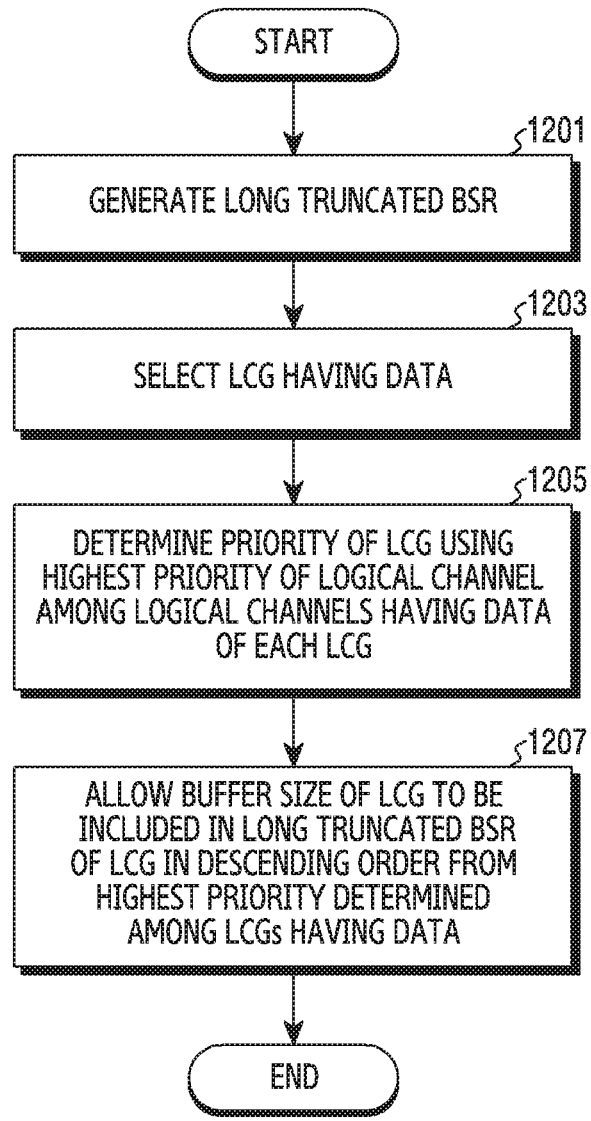
FIG. 12 is a flowchart for selecting a logical channel group to be reported to a long truncated BSR in a wireless communication system according to an embodiment of the disclosure.

FIG. 12 is a flowchart for selecting an LCG to be reported to a long truncated BSR in a wireless communication system according to an embodiment of the disclosure. FIG. 12 illustrates an operation method of the terminal 120.

Referring to FIG. 12, in operation 1201 if a long truncated BSR is to be transmitted according to the conditions shown in the embodiment of FIG. 5, the terminal selects an LCG to be included in the long truncated BSR in operation 1203. In operation 1205, the terminal determines a priority of a logical channel having the highest priority among LCGs having data for each LCG as the priority of the corresponding LCG. Next, in operation 1207, the terminal selects the LCGs in descending order from the highest priority representative value of the LCG selected in operation 1205 or in ascending order from the lowest priority representative value thereof among the LCGs having stored data, and allows the buffer size of the corresponding LCG to be included in the long truncated BSR. At this time, in order to determine that the buffer size of the LCG that has been reported, the terminal may include LCG IDs (e.g., LCG IDs 1125, 1135, and 1145 of FIG. 11). At this time, the LCGi field of FIG. 11 may be set to "1" for the LCG having a logical channel having actually stored data.

According to the embodiment described above, the terminal may transmit a report for uplink data, that is, a BSR to the base station. In addition, the disclosure further describes an embodiment for a common control channel (CCCH).

Resumption of an RRC connection refers to a procedure in which an RRC connection state between a terminal and a base station is switched from an RRC inactive mode to an RRC connected mode. In the case of an existing 4th generation (4G) mobile communication system (e.g., a long term evolution (LTE) system), the RRC connection state is classified into an idle mode and a connected mode. However, at the time of switching from the RRC idle mode to the connected mode, it is time consuming and the procedure in the network is complicated, so that the switching from the idle mode to the connected mode can be a burden on the system. Specifically, in order for the terminal in the idle mode to switch to the connected mode, after an RRC connection reestablishment request, the base station must retrieve the context of the terminal from a network device, such as a mobility management entity (MME), and a procedure for security is required. In addition, since an S1 interface between the base station and a serving gateway (S-GW) needs to be reestablished, the burden on the system may increase if the idle mode and the connected mode are frequently switched. Accordingly, in the case of the 5G mobile communication (e.g., NR), the inactive mode is defined. In the inactive mode, the terminal and the base station store the context of the terminal and can maintain an S1 bearer if necessary. Therefore, if the terminal in the inactive mode attempts to reconnect to the network, the terminal may connect to the network faster with fewer signaling procedures through an RRC resumption procedure and may transmit data.

Figure 13:
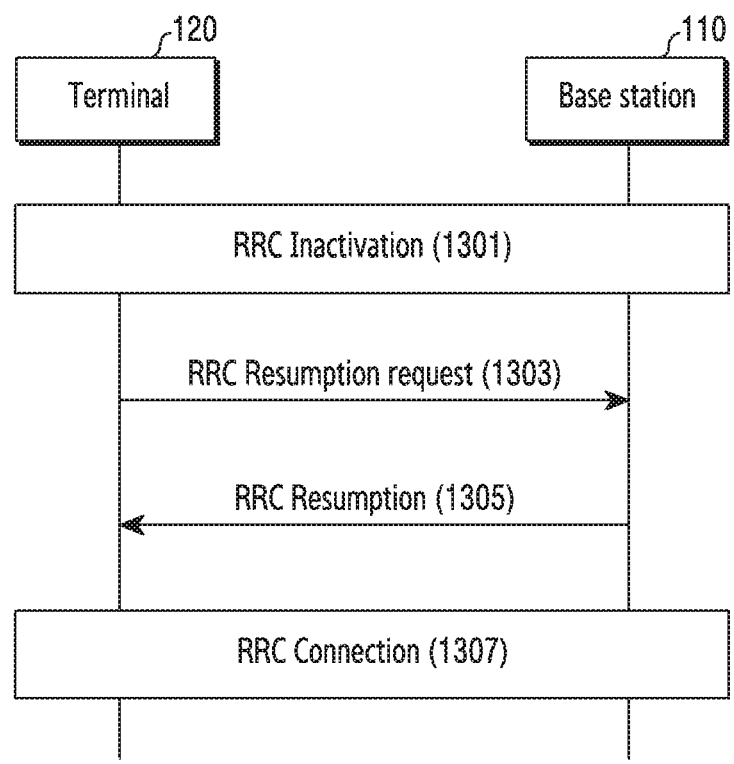
FIG. 13 illustrates a procedure for resuming a radio resource control (RRC) connection between a terminal and a base station in a wireless communication system according to an embodiment of the disclosure.

FIG. 13 illustrates a procedure for resuming an RRC connection between a terminal and a base station in a wireless communication system according to an embodiment of the disclosure.

Referring to FIG. 13, in operation 1301 the terminal 120 operates in an RRC inactive mode. If the terminal 120 in the inactive mode desires to switch to the connected mode, the terminal 120 performs camping on a cell, and then transmits an RRC resumption request message to the base station in operation 1303. Since the RRC resumption request message is a message transmitted before the RRC connection is established, the RRC resumption request message is transmitted through a CCCH, and is transmitted using only the settings necessary for message transmission. In this case, in order to receive allocation of uplink resources for transmitting the RRC resumption request message, the terminal 120 performs a random access procedure prior to operation 1303. The random access procedure may include operations in which the terminal 120 transmits a random access preamble to the base station 110 and the base station 110 transmits a random access response message to the terminal 120. The details of the random access will be described with reference to FIG. 14.

After receiving the RRC resumption request message of the terminal 120, in operation 1305, the base station 110 transmits an RRC resumption message to the terminal 120 to instruct the terminal 120 to switch to the RRC connected mode. The RRC resumption message may include configuration information to be used by the terminal 120 in a connected state, and the terminal 120 may apply the corresponding configuration information. Next, in operation 1307, the terminal 120 operates in the RRC connected mode.

Figure 14:
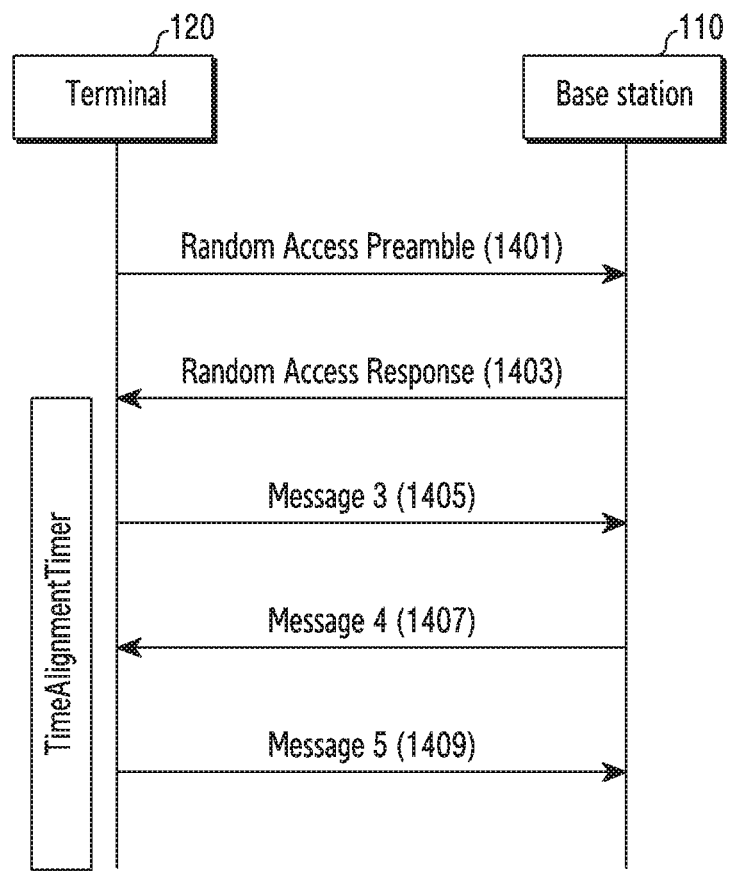
FIG. 14 illustrates an operation of a time alignment timer (TimeAlignmentTime) according to random access in a wireless communication system according to an embodiment of the disclosure.

The terminal may switch from the inactive mode or the idle mode to the connected mode, or perform a random access operation for another purpose. The random access is divided into contention-based random access and contention-free random access. FIG. 14 illustrates competition-based random access.

FIG. 14 illustrates an operation of a time alignment timer TimeAlignmentTime according to random access in a wireless communication system according to an embodiment of the disclosure.

Referring to FIG. 14, in the inactive mode or the idle mode, the terminal 120 cannot receive allocation of resources for transmitting a message 3 to the base station 110. Thus, in operation 1401, the terminal 120 receives allocation of radio resources to transmit the message 3 to the base station 110. In operation 1401, for uplink synchronization, the terminal 120 transmits a random access preamble to the base station 110. Resources for transmitting the random access preamble may be resources which are set by the base station 110 in advance using system information. However, since the resources for transmitting the random access preamble are not resources monopolized by a specific terminal, a collision may occur due to a plurality of terminals transmitting the random access preamble at the same time.

After receiving the random access preamble, in operation 1403, the base station 110 transmits a random access response (RAR) message to inform the terminal 120 of the reception of the random access preamble. The RAR message may include a timing advance command, an uplink grant, a temporary cell-radio network temporary identifier (C-RNTI), and the like. Among these, the timing advance command includes information for the terminal 120 to adjust transmission timing for uplink synchronization. The terminal 120 performs uplink synchronization with the base station 110 by advancing or lagging the transmission timing to the base station 110 according to a value indicated by a timing advance command field. The terminal 120 having received the timing advance command starts a TimeAlignmentTimer. While the TimeAlignmentTimer is operating, the value indicated by the timing advance command field is valid. In other words, while the TimeAlignmentTimer is operating, the terminal 120 can know that uplink synchronization with the base station 110 has been performed.

An uplink grant field indicates uplink resources to which the terminal 120 transmits the message 3 to the base station. The message 3 may be one of an RRC connection setup request message, an RRC connection reestablishment request message, an RRC resumption request message, and a system information request message according to the situation of the terminal 120. In operation 1405, the base station 110 receives the message 3. Next, in operation 1407, the base station 110 transmits a message 4. The message 4 may include one of an RRC connection setup message, an RRC connection reestablishment message, an RRC resumption message, and a system information message according to the content of the message 3. Next, in operation 1409, the terminal 120 transmits a message 5 to the base station 110 to notify that the configuration up to the message 4 is completed.

The system information refers to information indicating a common configuration of the base station or a wireless network, and the terminal must acquire the content of the system information before establishing an RRC connection. The system information may be classified into essential system information that the terminal must know before transmitting a radio signal to the base station, and optional system information that the terminal can request and receive from the base station. The essential system information may be broadcasted from the base station at regular intervals. For example, resources for transmitting a random access preamble or information that must be performed at the time of receiving the random access response message may be included in the essential system information.

Figure 15:
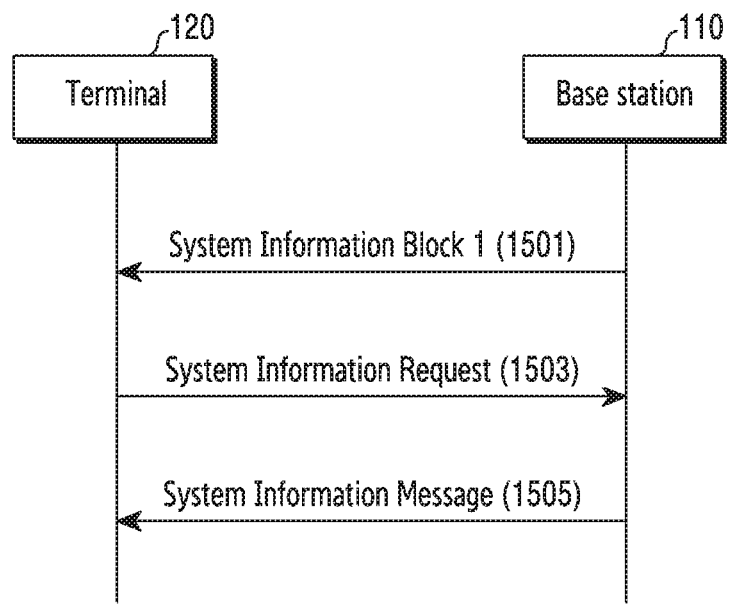
FIG. 15 illustrates a procedure in which a terminal receives system information from a base station in a wireless communication system according to an embodiment of the disclosure.

FIG. 15 illustrates a procedure in which a terminal receives system information from a base station in a wireless communication system according to an embodiment of the disclosure. In FIG. 15, the essential system information is referred to as "system information block 1 (SIB1)".

Referring to FIG. 15, in operation 1501 the terminal 120 may receive the SIB1 from the base station 110 through periodic monitoring. The SIB1 may include a time value (e.g., TimeAlignmentTimerCommon value) that can be used as the time of the TimeAlignmentTimer that starts after receiving the timing advance command included in the random access response message.

Next, if there is necessary system information even though it is not included in the SIB1, the terminal 120 transmits a system information request message to the base station 110 in operation 1503. The system information request message is an example of the message 3 in FIG. 14, and can be transmitted via a CCCH. Accordingly, in operation 1505, the base station 110 transmits the system information message, and the terminal 120 applies the received system information.

Figure 16:
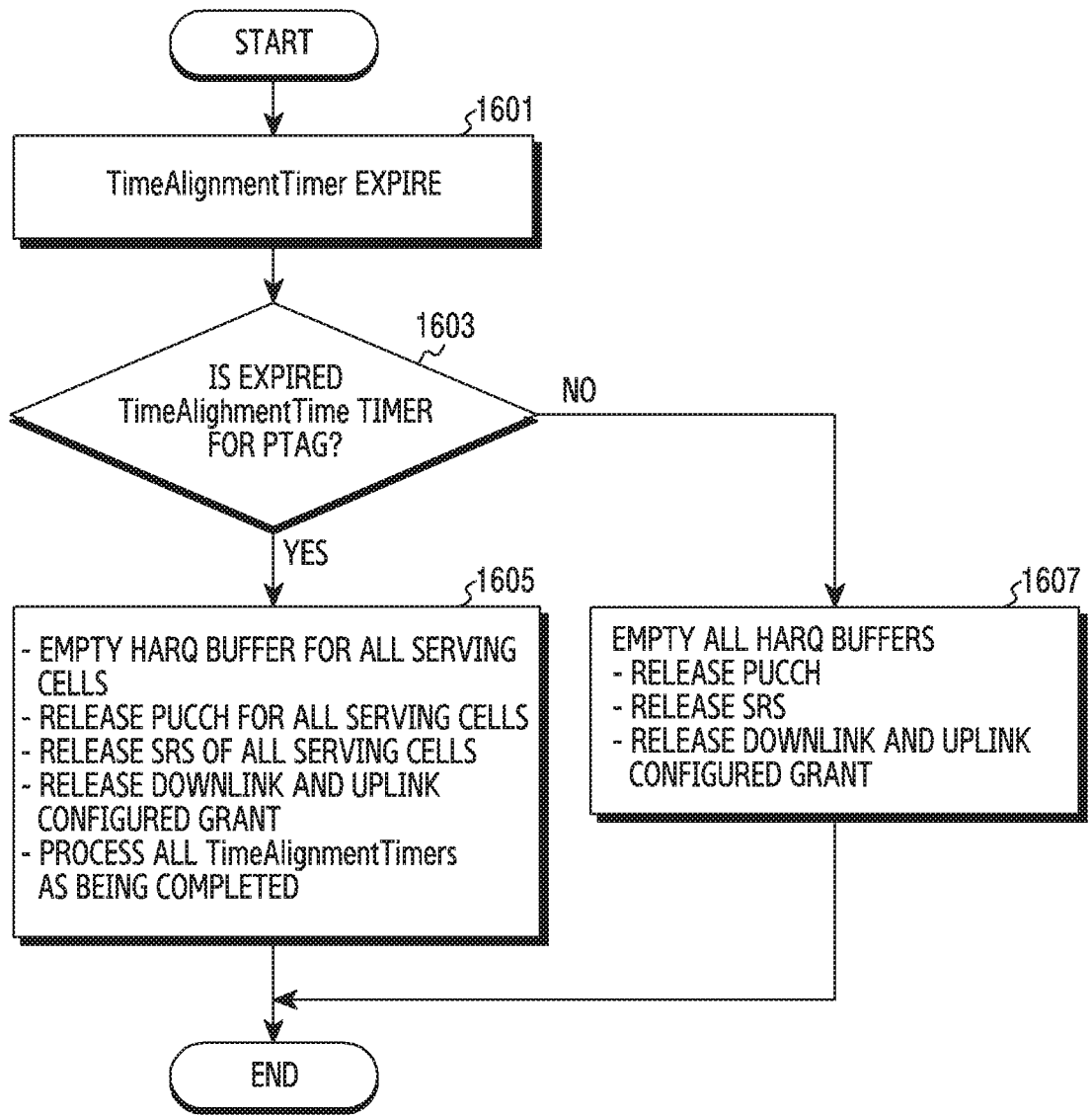
FIG. 16 is a flowchart illustrating a case in which TimeAlignmentTimer expires in a wireless communication system according to an embodiment of the disclosure.

FIG. 16 is a flowchart illustrating a case in which TimeAlignmentTimer expires in a wireless communication system according to an embodiment of the disclosure. FIG. 16 illustrates an operation method of the terminal 120.

Referring to FIG. 16, the TimeAlignmentTimer of the terminal is started or restarted if receiving the timing advance command message from the base station. While the TimeAlignmentTimer is operating, uplink synchronization between the terminal and the base station can be regarded as being performed. If the TimeAlignmentTimer expires in operation 1601, the terminal determines whether the expired TimingAlignmentTimer is a timer for a primary timing advance group (PTAG) in operation 1603. If the expired TimingAlignmentTimer is the timer for PTAG, in operation 1605, the terminal empties a hybrid automatic repeat request (HARQ) buffer for all serving cells, releases a physical uplink control channel (PUCCH) for all serving cells, and releases a sounding reference signal (SRS) of all serving cells. In addition, the terminal may release all configured grants set in the downlink and the uplink and may process all other TimeAlignmentTimers as expired. If the expired TimingAlignmentTimer is not the timer for PTAG, the expired timer is a timer for a secondary timing advance group (STAG). In this case, in operation 1607, the terminal performs an asynchronous operation for the corresponding timing advance group (TAG). Specifically, the terminal can empty all HARQ buffers, release the PUCCH, release the SRS, and release the downlink and uplink configured grants.

Figure 17:
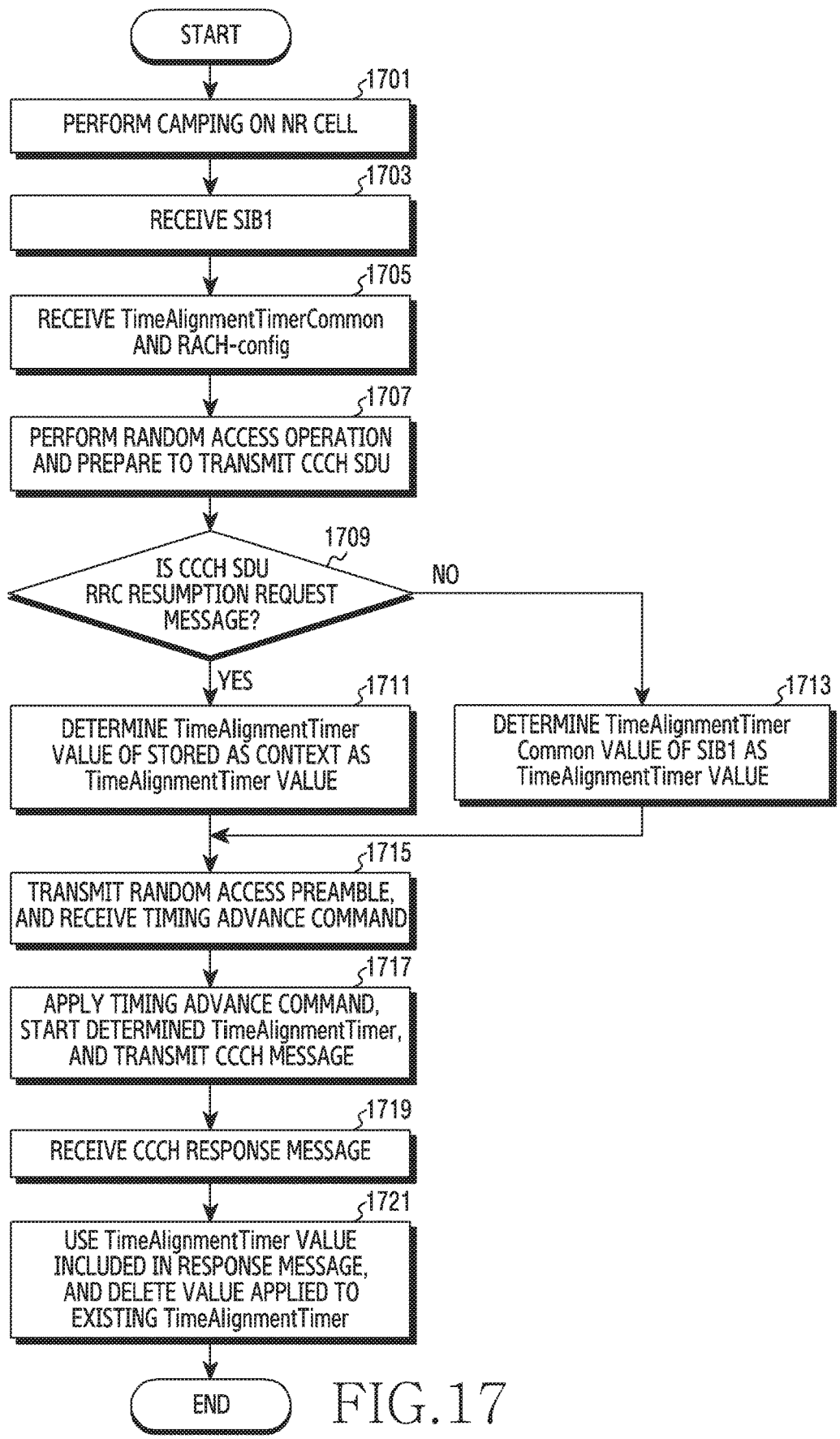
FIG. 17 is a flowchart illustrating a case in which a terminal configures a value of TimeAlignmentTimer in a wireless communication system according to an embodiment of the disclosure.

FIG. 17 is a flowchart illustrating a case in which a terminal configures a value of TimeAlignmentTimer in a wireless communication system according to an embodiment of the disclosure. FIG. 17 illustrates an operation method of the terminal 120.

Referring to FIG. 17, in operation 1701 the terminal performs camping on an NR cell. For example, in order to switch from the idle mode or the inactive mode to the connected mode, the terminal first performs camping on the cell. The embodiment of FIG. 17 illustrates that camping on a (3GPP NR) cell is performed. After performing camping on the cell, in operation 1703, the terminal receives the SIB1 from the base station of the corresponding cell. The SIB1 is the essential system information described in FIG. 15, and includes configuration information necessary for the terminal to transmit a radio signal, such as a random access preamble to the base station. In operation 1705, the terminal receives a timeAlignmentTimerCommon value and a random access channel (RACH)-config necessary for random access from the SIB 1. By configuring the RACH-config, the terminal can know the location of the radio resource for performing random access on the corresponding base station and the usable random access preamble. Next, in operation 1707, the terminal performs a random access operation and prepares to transmit a message corresponding to the CCCH, that is, a service data unit (SDU).

However, if receiving the random access response message, the terminal must start the TimeAlignmentTimer. At this time, it is necessary to configure a timer value to be used, and the timer value to be used may be classified depending on the type of the message (e.g., SDU) transmitted to the CCCH. The embodiment of FIG. 17 illustrates that the used timer value varies depending on whether the message transmitted by the terminal through the CCCH is an RRC resumption request message.

In operation 1709, the terminal determines whether the CCCH SDU is the RRC resumption request message. If the transmitted message is the RRC resumption request message, the terminal uses the TimeAlignmentTimer value of access stratum (AS) context stored in the terminal as a value of the corresponding timer in operation 1711. On the other hand, if the transmitted message is not the RRC resumption request message, that is, if a CCCH message is the RRC connection setup request message, the RRC connection reestablishment request message, or the system information request message, the terminal uses the timeAlignmentTimerCommon value included in the SIB1 as the value of the TimeAlignmentTimer in operation 1713. As another example, the terminal may start the TimeAlignmentTimer using a timer value configured in advance as a default value instead of the TimeAlignmentTimerCommon value. The default value may be set by the base station to which the terminal has previously connected, or may be a value set in the terminal during the process in which the terminal is manufactured.

Next, in operation 1715, the terminal actually transmits the random access preamble and receives the random access response message. If receiving the timing advance command in the random access response message, in operation 1717, the terminal applies the corresponding timing advance command and starts the TimeAlignmentTimer using the value of the previously determined TimeAlignmentTimer. Next, the terminal may transmit the CCCH message using the radio resource indicated by an uplink (UL) grant field in the random access response message. Next, in operation 1719, the terminal receives a response message to the CCCH message transmitted from the base station. For example, if the CCCH message transmitted by the terminal is the RRC resumption request message, the terminal receives the RRC resumption message from the base station. If the TimeAlignmentTimer value to be used by the terminal is configured in the CCCH message received from the base station in operation 1721, the terminal uses the configured value and deletes the value applied to the TimeAlignmentTimer.

Figure 18:
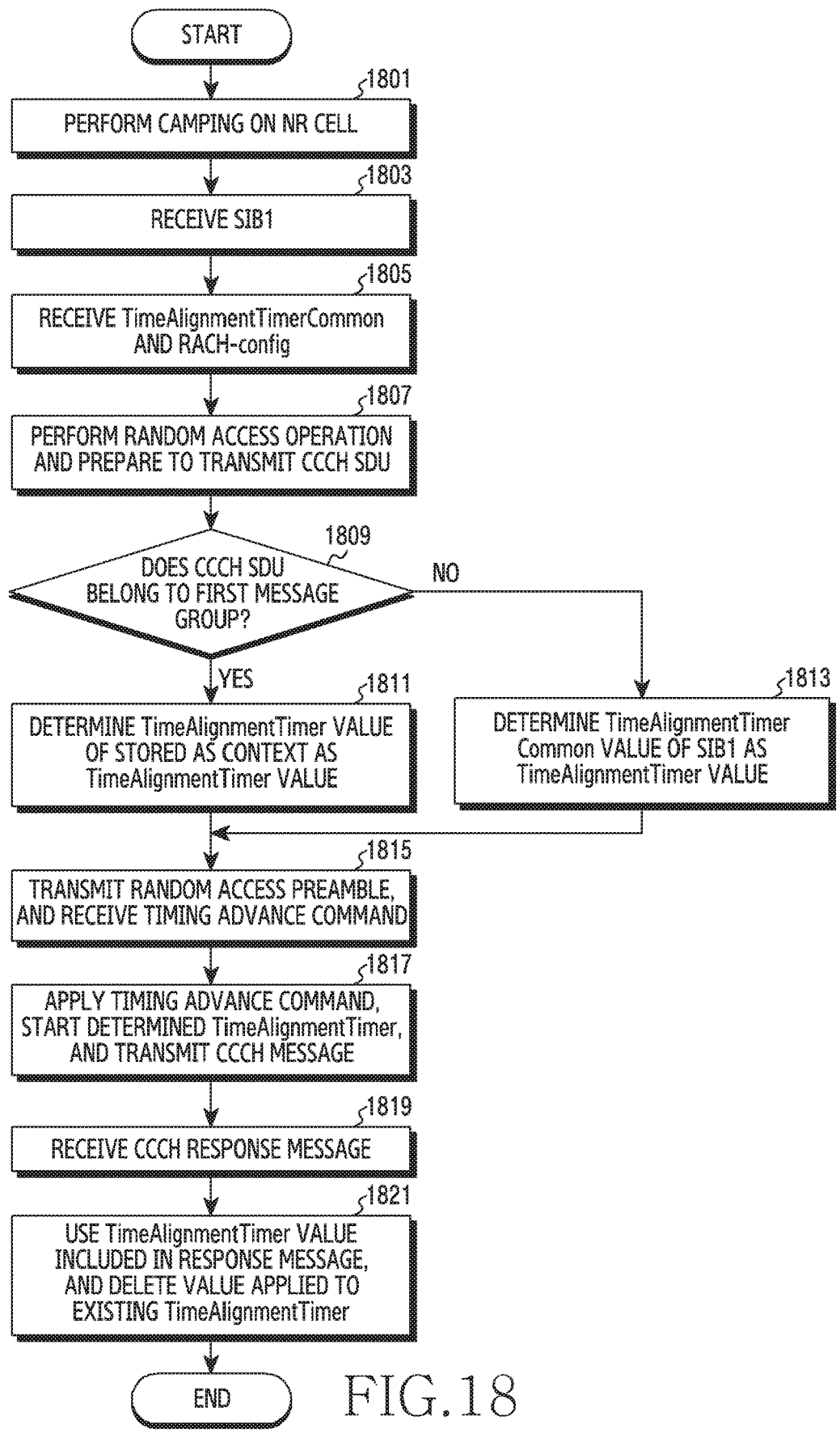
FIG. 18 is a flowchart illustrating a case in which a terminal configures a value of TimeAlignmentTimer in a wireless communication system according to an embodiment of the disclosure.

FIG. 18 is a flowchart illustrating a case in which a terminal configures a value of TimeAlignmentTimer in a wireless communication system according to an embodiment of the disclosure. FIG. 18 illustrates an operation method of the terminal 120.

Referring to FIG. 18, in operation 1801 the terminal performs camping on an NR cell. For example, in order for the terminal to switch from the idle mode or the inactive mode to the connected mode, the terminal first performs camping on the cell. The embodiment of FIG. 18 illustrates that camping on a 3GPP NR cell is performed. After performing camping on the cell, in operation 1803, the terminal receives the SIB1 from the base station of the corresponding cell. The SIB1 is the essential system information described in FIG. 15, and includes configuration information necessary for the terminal to transmit a radio signal, such as a random access preamble to the base station. In operation 1805, the terminal receives a timeAlignmentTimerCommon value and an RACH-config necessary for random access from the SIB1. By configuring the RACH-config, the terminal can know the location of the radio resource for performing random access on the corresponding base station and the usable random access preamble. Next, in operation 1807, the terminal performs a random access operation and prepares to transmit a message corresponding to the CCCH, that is, a SDU.

If receiving the random access response message, the terminal must start the TimeAlignmentTimer. At this time, it is necessary to configure a timer value to be used, and the timer value to be used may be classified depending on the type of the message (e.g., SDU) transmitted through the CCCH. The embodiment of FIG. 18 illustrates that the used timer value varies depending on a group of the message transmitted by the terminal through the CCCH. According to an embodiment of the disclosure, messages transmitted through the CCCH can be classified into a first message group and a second message group as shown in Table 1 below.

TABLE 1

|  | First message group | Second message group |
| --- | --- | --- |
| First embodiment | RRC resumption request | Other CCCH message |
| Second embodiment | RRC resumption request, system information request | Other CCCH message |
| Third embodiment | System information request | Other CCCH message |

In addition, the classification between the first message group and the second message group can be variously defined.

In operation 1809, the terminal determines whether a CCCH SDU belongs to the first message group. If the transmitted message is the message belonging to the first message group, in operation 1811, the terminal uses the TimeAlignmentTimer value of the AS context used in the previous connected mode and stored in the terminal as the value of the corresponding timer. If the transmitted message is not the message belonging to the first message group, that is, if the corresponding CCCH message is the RRC connection setup request message, the RRC connection reestablishment request message, or the system information request message, in operation 1813, the terminal uses the timeAlignmentTimerCommon value included in the SIB1 as the value of the TimeAlignmentTimer. As another example, the terminal may start the TimeAlignmentTimer using a timer value configured in advance as a default value instead of the TimeAlignmentTimerCommon value. The default value may be set by the base station to which the terminal has previously connected, or may be a value set in the terminal during the process in which the terminal is manufactured.

Next, in operation 1815, the terminal transmits the random access preamble and receives the random access response message. If receiving the timing advance command in the random access response message, in operation 1817, the terminal applies the corresponding timing advance command and starts the TimeAlignmentTimer using the value of the previously determined TimeAlignmentTimer. Next, in operation 1819, the terminal transmits the CCCH message using radio resources indicated by the uplink grant field in the random access response message. Next, in operation 1819, the terminal receives a response message to the CCCH message transmitted by the base station. For example, if the CCCH message transmitted by the terminal is the RRC resumption request message, the terminal receives the RRC resumption message from the base station. If the TimeAlignmentTimer value to be used by the terminal is configured in the CCCH message received from the base station, in operation 1821, the terminal uses the configured value and deletes the value applied to the TimeAlignmentTimer that is previously used.

Figure 19:
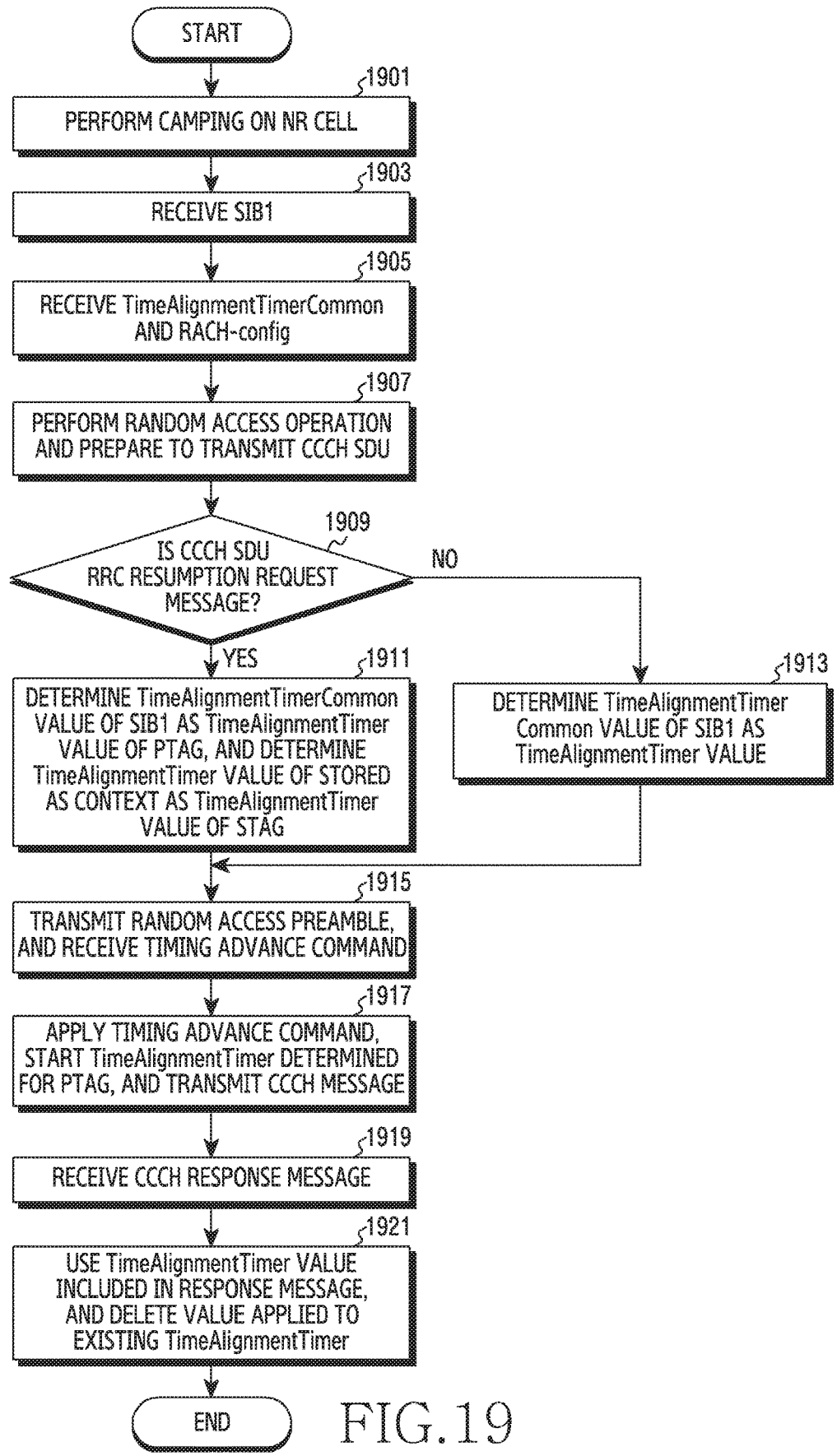
FIG. 19 is a flowchart illustrating a case in which a terminal configures a value of TimeAlignmentTimer in a wireless communication system according to an embodiment of the disclosure.

FIG. 19 is a flowchart illustrating a case in which a terminal configures a value of TimeAlignmentTimer in a wireless communication system according to an embodiment of the disclosure. FIG. 19 illustrates an operation method of the terminal 120.

Referring to FIG. 19, in operation 1901 the terminal performs camping on an NR cell. For example, in order for the terminal to switch from the idle mode or the inactive mode to the connected mode, the terminal first performs camping on the cell. The embodiment of FIG. 19 illustrates that camping on a 3GPP NR cell is performed. After performing camping on the cell, in operation 1903, the terminal receives the SIB1 from the base station of the corresponding cell. The SIB1 is the essential system information described in FIG. 15, and includes configuration information necessary for the terminal to transmit a radio signal, such as a random access preamble to the base station. In operation 1905, the terminal receives a timeAlignmentTimerCommon value and an RACH-config necessary for random access from the SIB1. By configuring the RACH-config, the terminal can know the location of the radio resource for performing random access on the corresponding base station and the usable random access preamble. Next, in operation 1907, the terminal performs a random access operation and prepares to transmit a message corresponding to the CCCH, that is, a SDU.

If receiving the random access response message, the terminal must the TimeAlignmentTimer. At this time, it is necessary to configure a timer value to be used, and the timer value to be used may be classified depending on the type of the message (e.g., SDU) transmitted through the CCCH. The embodiment of FIG. 19 illustrates that the used timer value varies depending on whether the message transmitted through the CCCH is the RRC resumption request message.

In operation 1909, the terminal determines whether a CCCH SDU is the RRC resumption request message. If the transmitted message is the RRC resumption request message, in operation 1911, the terminal determines the time-AlignmentTimerCommon value included in the SIB1 as the TimeAlignmentTimer value of the PTAG, and uses the TimeAlignmentTimer value of the stored AS context as the TimeAlignmentTimer value of the STAG. If the transmitted message is not the RRC resumption request message, that is, if the corresponding CCCH message is the RRC connection setup request message, the RRC connection reestablishment request message, or the system information request message, in operation 1913, the terminal uses the timeAlignmentTimerCommon value included in the SIB1 as the TimeAlignmentTimer value. As another example, the terminal may start the TimeAlignmentTimer using a timer value configured in advance as a default value instead of the TimeAlignmentTimerCommon value. The default value may be set by the base station to which the terminal has previously connected, or may be a value set in the terminal during the process in which the terminal is manufactured.

Next, in operation 1915, the terminal transmits the random access preamble and receives the random access response message. If receiving the timing advance command in the random access response message, in operation 1917, the terminal applies the corresponding timing advance command and starts the TimeAlignmentTimer using the value of the previously determined TimeAlignmentTimer. Next, the terminal may transmit the CCCH message using the radio resource indicated by an uplink grant field in the random access response message. Next, in operation 1919, the terminal receives a response message to the CCCH message transmitted from the base station. For example, if the CCCH message transmitted by the terminal is the RRC resumption request message, the terminal receives the RRC resumption message from the base station. If the TimeAlignmentTimer value to be used by the terminal is configured in the CCCH message received from the base station, in operation 1921, the terminal uses the configured value and deletes the value applied to the TimeAlignmentTimer.

Figure 20:
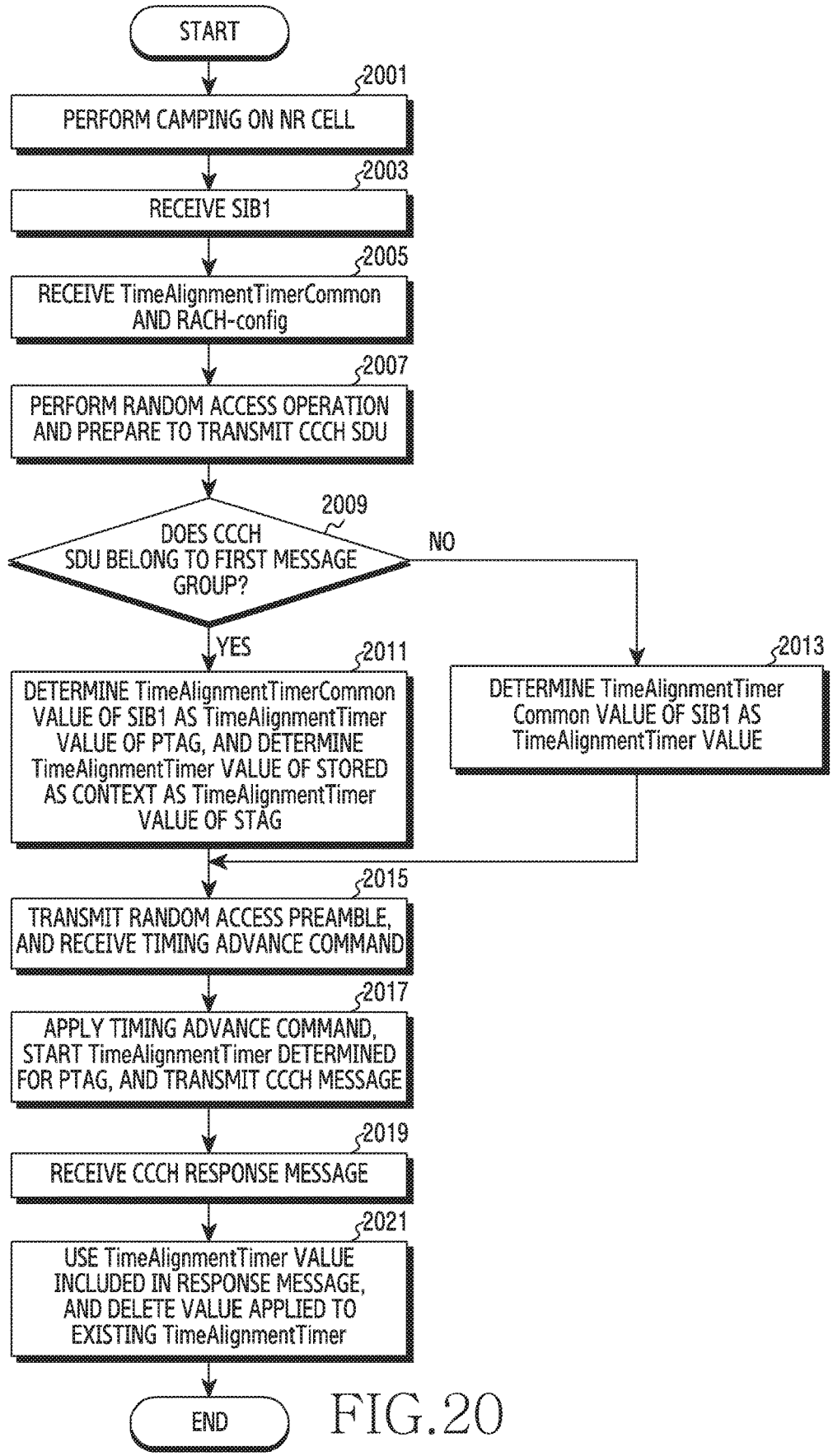
FIG. 20 is a flowchart illustrating a case in which a terminal configures a value of TimeAlignmentTimer in a wireless communication system according to an embodiment of the disclosure.

FIG. 20 is a flowchart illustrating a case in which a terminal configures a value of TimeAlignmentTimer in a wireless communication system according to an embodiment of the disclosure. FIG. 20 illustrates an operation method of the terminal 120.

Referring to FIG. 20, in operation 2001 the terminal performs camping on an NR cell. For example, in order for the terminal to switch from the idle mode or the inactive mode to the connected mode, the terminal first performs camping on the cell. The embodiment of FIG. 20 illustrates that camping on a 3GPP NR cell is performed. After performing camping on the cell, in operation 2003, the terminal receives the SIB1 from the base station of the corresponding cell. The SIB1 is the essential system information described in FIG. 15, and includes configuration information necessary for the terminal to transmit a radio signal, such as a random access preamble to the base station. In operation 2005, the terminal receives a timeAlignmentTimerCommon value and an RACH-config necessary for random access from the SIB1. By configuring the RACH-config, the terminal can know the location of the radio resource for performing random access on the corresponding base station and the usable random access preamble. Next, in operation 2007, the terminal performs a random access operation and prepares to transmit a message corresponding to the CCCH, that is, a SDU.

If receiving the random access response message, the terminal must start the TimeAlignmentTimer. At this time, it is necessary to configure a timer value to be used, and the timer value to be used may be classified depending on the type of the message (e.g., SDU) transmitted through the CCCH. The embodiment of FIG. 20 illustrates that the used timer value varies depending on a group of the message transmitted by the terminal through the CCCH. According to embodiments of the disclosure, messages transmitted through the CCCH can be classified into a first message group and a second message group as shown in Table 2 below.

TABLE 2

|  | First message group | Second message group |
| --- | --- | --- |
| First embodiment | RRC resumption request | Other CCCH message |
| Second embodiment | RRC resumption request, system information request | Other CCCH message |
| Third embodiment | System information request | Other CCCH message |

In addition, the classification between the first message group and the second message group can be variously defined.

In operation 2009, the terminal determines whether a CCCH SDU belongs to the first message group. If the transmitted message is the message belonging to the first message group, in operation 2011, the terminal determines the timeAlignmentTimerCommon value included in the SIB1 as the TimeAlignmentTimer value of the PTAG, and uses the TimeAlignmentTimer value of the stored AS context as the TimeAlignmentTimer value of the STAG. If the transmitted message is not the message belonging to the first message group, that is, if the corresponding CCCH message is the RRC connection setup request message, the RRC connection reestablishment request message, or the system information request message, in operation 2013, the terminal uses the timeAlignmentTimerCommon value included in the SIB1 as the value of the TimeAlignmentTimer. As another example, the terminal may start the TimeAlignmentTimer using a timer value configured in advance as a default value instead of the TimeAlignmentTimerCommon value. The default value may be set by the base station to which the terminal has previously connected, or may be a value set in the terminal during the process in which the terminal is manufactured.

Next, in operation 2015, the terminal transmits the random access preamble and receives the random access response message. If receiving the timing advance command in the random access response message, in operation 2017, the terminal applies the corresponding timing advance command and starts the TimeAlignmentTimer using the value of the previously determined TimeAlignmentTimer. Next, in operation 2019, the terminal transmits the CCCH message using radio resources indicated by the uplink grant field in the random access response message. Next, in operation 2019, the terminal receives a response message to the CCCH message transmitted by the base station. For example, if the CCCH message transmitted by the terminal is the RRC resumption request message, the terminal receives the RRC resumption message from the base station. If the TimeAlignmentTimer value to be used by the terminal is configured in the CCCH message received from the base station, in operation 2021, the terminal uses the configured value and deletes the value applied to the TimeAlignmentTimer that is previously used.

Figure 21:
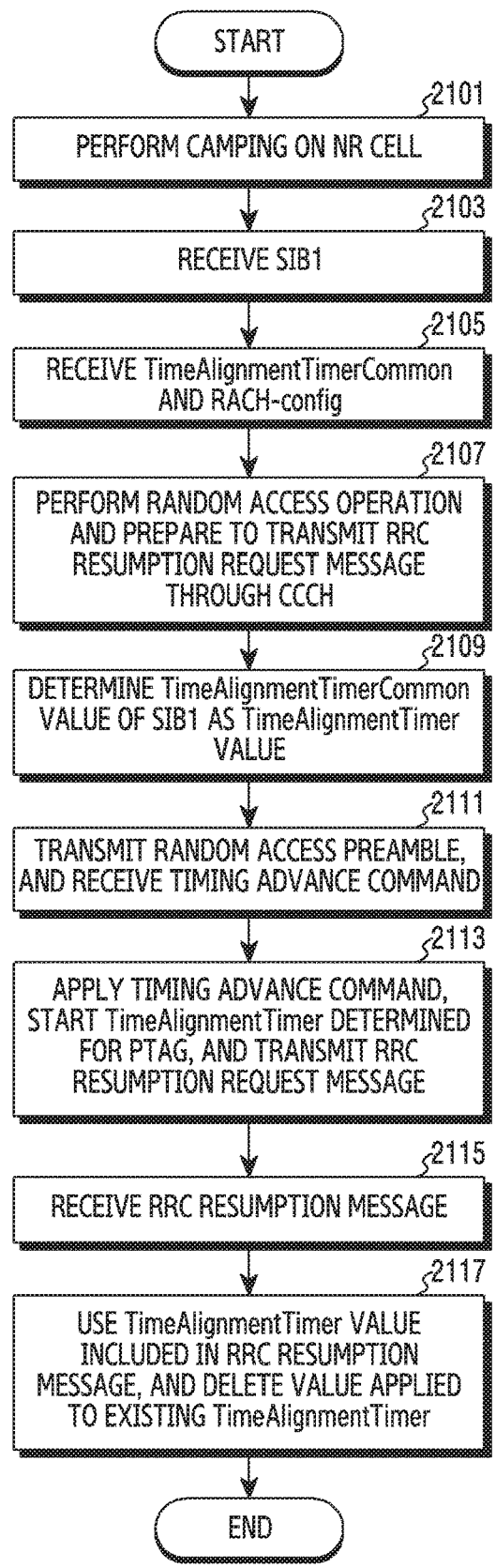
FIG. 21 is a flowchart illustrating a case in which a terminal configures a value of TimeAlignmentTimer in an RRC resumption request process in a wireless communication system according to an embodiment of the disclosure.

FIG. 21 is a flowchart illustrating a case in which a terminal configures a value of TimeAlignmentTimer in an RRC resumption request process in a wireless communication system according to an embodiment of the disclosure. FIG. 21 illustrates an operation method of the terminal 120. FIG. 21 illustrates that camping on a 3GPP NR cell is performed.

Referring to FIG. 21, in operation 2101 the terminal performs camping on an NR cell. For example, in order for the terminal to switch from the idle mode or the inactive mode to the connected mode, the terminal first performs camping on the cell. After performing camping on the cell, in operation 2103, the terminal receives the SIB1 from the base station of the corresponding cell. The SIB1 is the essential system information described in FIG. 15, and includes configuration information necessary for the terminal to transmit a radio signal, such as a random access preamble to the base station. In operation 2105, the terminal receives a timeAlignmentTimerCommon value and an RACH-config necessary for random access from the SIB 1. Based on the RACH-config, the terminal can know the location of the radio resource for performing random access on the corresponding base station and the usable random access preamble. Next, in operation 2107, the terminal performs a random access operation and prepares to transmit an RRC resumption message corresponding to the CCCH.

Next, in operation 2111, the terminal transmits the random access preamble and receives the random access response message including the timing advance command. If receiving the random access response message, the terminal starts the TimeAlignmentTimer. At this time, a timer value to be used must be configured. In the case of the embodiment of FIG. 21, in operation 2109, the terminal determines the timer value based on the timeAlignmentTimerCommon value included in the SIB1 and the TimeAlignmentTimer value. The timer value may be configured before receiving the random access response message or after receiving the random access response message.

If receiving the timing advance command in the random access response message, in operation 2113, the terminal applies the corresponding timing advance command and starts the TimeAlignmentTimer using the value of the TimeAlignmentTimer determined based on the SIB 1. Next, the terminal may transmit the RRC resumption request message through the CCCH using the radio resources indicated by the uplink grant field in the random access response message.

Next, in operation 2115, the terminal receives the RRC resumption message that is a response to the RRC resumption request message transmitted by the base station. If the TimeAlignmentTimer value to be used by the terminal is configured in the RRC resumption message received from the base station, in operation 2117, the terminal uses the configured value and deletes the value applied to the TimeAlignmentTimer that is previously used. As another example, the terminal may start the TimeAlignmentTimer using a timer value configured in advance as a default value instead of the TimeAlignmentTimerCommon value. The default value may be set by the base station to which the terminal has previously connected, or may be a value set in the terminal during the process in which the terminal is manufactured.

As described with reference to FIGS. 17 to 21, if the terminal transmits the CCCH message, the TimeAlignmentTimer value configured by the terminal does not exist in the base station, so that the terminal may use the TimeAlignmentTimerCommon included in SIB1 or use the AS context that is previously used and stored. However, the TimeAlignmentCommon value may not be included in the SIB1, or the AS context stored by the terminal may not exist. In this case, it is difficult for the terminal to apply the TimeAlignmentTimer value. An operation if the configured TimeAlignmentTimer value does not exist is shown in FIG. 22 below.

Figure 22:
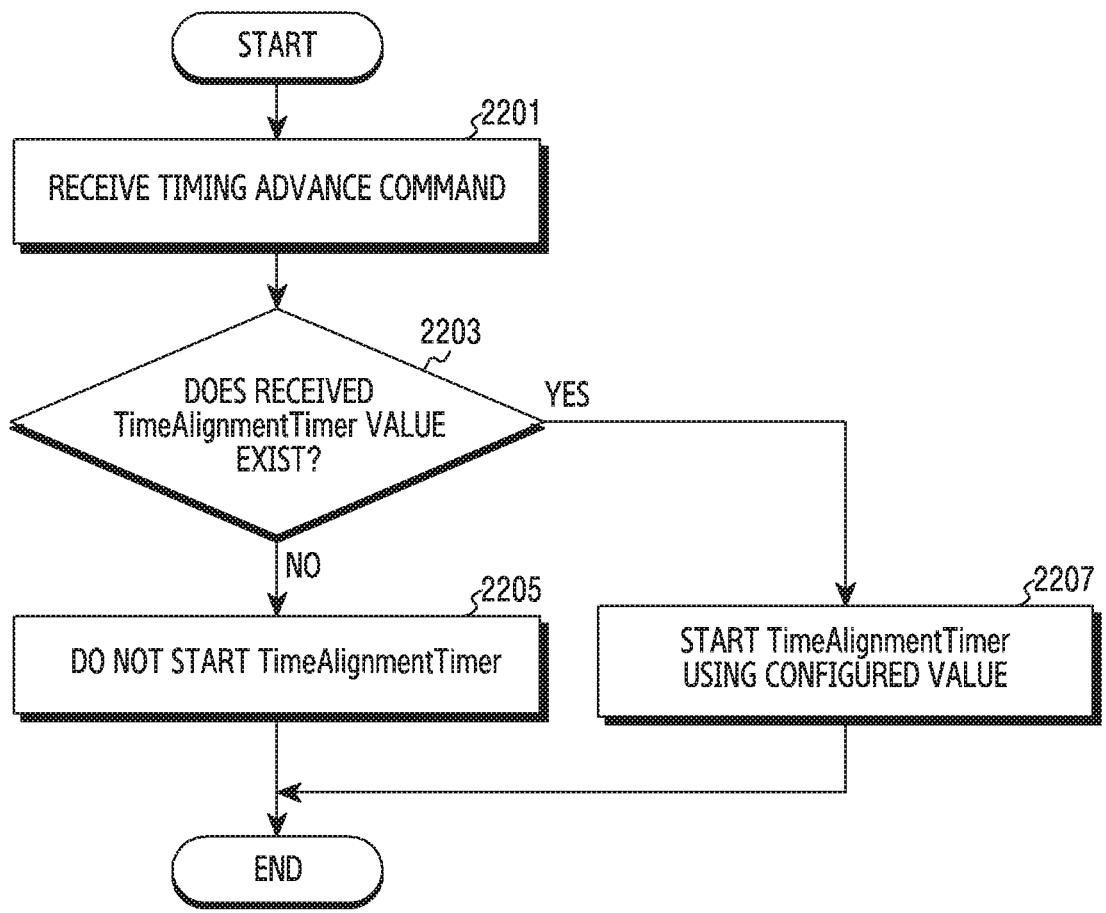
FIG. 22 is a flowchart illustrating a case in which a terminal configures a value of TimeAlignmentTimer in a wireless communication system according to an embodiment of the disclosure.

FIG. 22 is a flowchart illustrating a case in which a terminal configures a value of TimeAlignmentTimer in a wireless communication system according to an embodiment of the disclosure. FIG. 22 illustrates an operation method of the terminal 120.

Referring to FIG. 22, in operation 2201 the terminal receives the timing advance command. If the terminal receives the timing advance command in a random access response or in another method, the terminal may determine whether the TimeAlignmentTimer value configured in a current cell or a current base station exists in operation 2203. If the configured TimeAlignmentTimer value does not exist, in operation 2205, the terminal may not start the TimeAlignmentTimer because there is no timer value to be applied. Alternatively, according to another embodiment of the disclosure, it is possible to start the TimeAlignmentTimer using the timer value configured as the default value in advance. If the configured TimeAlignmentTimer value exists, in operation 2207, the terminal may start the TimeAlignmentTimer using the configured value.

The embodiment described with reference to FIG. 22 can be applied only in a case of transmitting at least one message of the RRC resumption request message, the system information request message, and the RRC setup connection message. However, the disclosure is not limited thereto.

Methods according to embodiments stated in claims and/or specifications of the disclosure may be implemented in hardware, software, or a combination of hardware and software.

If the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to an embodiment of the disclosure as defined by the appended claims and/or disclosed herein.

The programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks, such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and an embodiment of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A user equipment (UE) in a wireless communication system, the UE comprising:
    a transceiver; and
    a processor coupled to the transceiver and configured to:
        generate, in case that logical channel groups have data available for transmission and a number of padding bits is larger than a size of a short buffer status report (BSR) plus a subheader associated with the short BSR and is smaller than a size of a long BSR plus a subheader associated with the long BSR, a long truncated BSR informing data volume for part of the logical channel groups, and
        transmit the long truncated BSR to a base station,
    wherein the long truncated BSR includes the data volume for the part of the logical channel groups following a decreasing order of a highest priority logical channel among a plurality of logical channels in each of the logical channel groups, and
    wherein the decreasing order of the highest priority logical channel among the plurality of logical channels in each of the logical channel groups is determined based on a logical channel having a highest priority, regardless of whether the logical channel has data, in each of the logical channel groups.

2. The UE of claim 1, wherein the long truncated BSR comprises:
    information indicating the logical channel groups having data available for transmission, and
    information regarding the data volume for the part of the logical channel groups.

3. The UE of claim 1, wherein the long truncated BSR includes the data volume for the part of the logical channel groups following the decreasing order of the highest priority logical channel among the plurality of logical channels in each of the logical channel groups and, in case of same priority, an increasing order of logical channel group identifier.

4. The UE of claim 1, wherein the long truncated BSR is transmitted as a padding BSR.

5. The UE of claim 1,
    wherein the short BSR is a BSR that includes an identifier of a single logical channel and information regarding data volume for the single logical channel, and
    wherein the long BSR is a BSR that includes information regarding data volume for each of the logical channel groups having data available for transmission.

6. The UE of claim 5, wherein the long truncated BSR is classified into a periodic BSR, a regular BSR, and a padding BSR depending on a time during which the data is transmitted and an amount of information.

7. A base station in a wireless communication system, the base station comprising:
    a transceiver; and
    a processor coupled to the transceiver and configured to receive, from a user equipment (UE), a long truncated buffer status report (BSR) for informing data volume for part of logical channel groups having data available for transmission,
    wherein the long truncated BSR is determined in case that the logical channel groups have data available for transmission and a number of padding bits is larger than a size of a short BSR plus a subheader associated with the short BSR and is smaller than a size of a long BSR plus a subheader associated with the long BSR,
    wherein the long truncated BSR includes the data volume for the part of the logical channel groups following a decreasing order of a highest priority logical channel among a plurality of logical channels in each of the logical channel groups, and
    wherein the decreasing order of the highest priority logical channel among the plurality of logical channels in each of the logical channel groups is determined based on a logical channel having a highest priority, regardless of whether the logical channel has data, in each of the logical channel groups.

8. The base station of claim 7, wherein the long truncated BSR comprises:
    information indicating the logical channel groups having data available for transmission, and
    information regarding the data volume for the part of the logical channel groups.

9. The base station of claim 7, wherein the long truncated BSR includes the data volume for the part of the logical channel groups following the decreasing order of the highest priority logical channel among the plurality of logical channels in each of the logical channel groups and, in case of same priority, an increasing order of logical channel group identifier.

10. The base station of claim 7, wherein the long truncated BSR is transmitted as a padding BSR.

11. The base station of claim 7,
wherein the short BSR is a BSR that includes an identifier of a single logical channel and information regarding data volume for the single logical channel, and
wherein the long BSR is a BSR that includes information regarding data volume for each of the logical channel groups having data available for transmission.

* * * * *